(12) United States Patent
Bae et al.

(10) Patent No.: US 12,075,392 B2
(45) Date of Patent: Aug. 27, 2024

(54) METHOD, USER EQUIPMENT, DEVICE, AND STORAGE MEDIUM FOR PERFORMING UPLINK TRANSMISSION, AND METHOD AND BASE STATION FOR PERFORMING UPLINK RECEPTION

(71) Applicant: LG ELECTRONICS INC., Seoul (KR)

(72) Inventors: Duckhyun Bae, Seoul (KR); Suckchel Yang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 17/439,117

(22) PCT Filed: Mar. 30, 2020

(86) PCT No.: PCT/KR2020/004352
§ 371 (c)(1),
(2) Date: Sep. 14, 2021

(87) PCT Pub. No.: WO2020/204541
PCT Pub. Date: Oct. 8, 2020

(65) Prior Publication Data
US 2022/0159652 A1  May 19, 2022

(30) Foreign Application Priority Data
Mar. 29, 2019 (KR) .................. 10-2019-0037261

(51) Int. Cl.
*H04W 72/0446* (2023.01)
(52) U.S. Cl.
CPC .............. *H04W 72/0446* (2013.01)

(58) Field of Classification Search
CPC ................................................ H04W 72/0446
See application file for complete search history.

(56) References Cited

U.S. PATENT DOCUMENTS

2020/0162208 A1* 5/2020 Moon ..................... H04L 1/189
2021/0377979 A1* 12/2021 Bhamri ............ H04W 72/0453
(Continued)

FOREIGN PATENT DOCUMENTS

KR          101899034 B1    9/2018

OTHER PUBLICATIONS

Intel Corporation, "On enhancements to PUSCH for eURLLC", 3GPP TSG RAN WG1 Ran 1#96, Feb. 25-Mar. 1, 2019, R1-1902495.
(Continued)

*Primary Examiner* — Ajay Cattungal
(74) *Attorney, Agent, or Firm* — BRYAN CAVE LEIGHTON PAISNER LLP

(57) ABSTRACT

According to an aspect of the present disclosure, a method for transmitting an uplink signal by a user equipment in a wireless communication system comprises: receiving resource allocation information including a first start and length indicator value (SLIV) and a second SLIV, wherein the first SLIV is associated with a start symbol (S1) of a first uplink time resource and the number (L1) of symbols, the second SLIV is associated with an offset value (S2) associated with a start symbol of a second uplink time resource and the number (L2) of symbols, S1 and S2 are integers of 0 or larger, and L1 and L2 are integers of 1 or larger; and transmitting the uplink signal on the first uplink time resource and the second uplink time resource on the basis of the resource allocation information, wherein S2 is an offset value between a last symbol of the first uplink time resource and the start symbol of the second uplink time resource.

8 Claims, 17 Drawing Sheets

(56) References Cited

U.S. PATENT DOCUMENTS

2022/0014333 A1* 1/2022 Bhamri ............. H04W 72/0453
2022/0159652 A1* 5/2022 Bae ................... H04W 72/0446

OTHER PUBLICATIONS

InterDigital Inc., "On potential PUSCH enhancements for URLLC", 3GPP TSG RAN WG1 #96, Feb. 25-Mar. 1, 2019, R1-1902608.
Vivo, "Outcome of offline discussion on Configured grant enhancement", 3GPP TSG RAN WG1 96, Feb. 25-Mar. 1, 2019, R1-1903476.
Huawei, "Status Report to TSG", 3GPP TSG RAN meeting #83, Mar. 18-21, 2019, RP-190339.

* cited by examiner (a)

(b)

METHOD, USER EQUIPMENT, DEVICE, AND STORAGE MEDIUM FOR PERFORMING UPLINK TRANSMISSION, AND METHOD AND BASE STATION FOR PERFORMING UPLINK RECEPTION

This application is the National Stage filing under 35 U.S.C. 371 of International Application No. PCT/KR2020/004352 filed on Mar. 30, 2020, which claims priority to Korean Patent Application No. 10-2019-0037261 filed on Mar. 29, 2019, the contents of which are all hereby incorporated by reference herein in their entirety.

TECHNICAL FIELD

The present disclosure relates to a wireless communication system.

BACKGROUND ART

Various technologies and devices such as machine-to-machine (M2M) communication, machine type communication (MTC), and smartphones and tablet personal computers (PCs) that require high data transfer rates have emerged and been disseminated. Thus, the amount of data required to be processed in a cellular network has rapidly increased. To satisfy a sudden increase in data processing requirements, a carrier aggregation (CA) technology for efficiently using more bands, a cognitive radio technology, a multi-antenna technology for increasing data transfer capacity within a limited frequency, and a multi-base station cooperation technology, and so on have been researched.

As more and more communication devices demand larger communication capacities, the need for enhanced mobile broadband (eMBB) communication relative to the legacy radio access technologies (RATs) has emerged. Massive machine type communication (mMTC) that provides various services by interconnecting multiple devices and things irrespective of time and place is also one of main issues to be addressed for future-generation communications.

A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed.

DISCLOSURE

Technical Problem

With the introduction of a new wireless communication technology, the number of user equipments (UEs) to which a base station needs to provide services in a predetermined resource region has increased, and the amount of data and control information that the base station transmits/receives to/from the UEs served by the BS has increased as well. Since the amount of radio resources available for the base station to communicate with the UE(s) is finite, a new method for the base station to efficiently transmit/receive uplink/downlink data and/or uplink/downlink control information to/from the UE(s) on the finite radio resources is needed. In other words, as the node density and/or the UE density increases, a method for efficiently communicating with high density nodes or high density UEs is required.

In addition, there is a need for a method to efficiently support various services with different requirements in a wireless communication system.

Further, overcoming delay or latency is a significant challenge for applications where the performance is sensitive to the delay/latency.

The technical objects that can be achieved through the present disclosure are not limited to what has been particularly described hereinabove and other technical objects not described herein will be more clearly understood by persons skilled in the art from the following detailed description.

Technical Solution

Various examples of the present disclosure may provide a method of transmitting and receiving a signal in a wireless communication system and apparatus for supporting the same.

In an aspect of the present disclosure, a method of transmitting an uplink signal by a user equipment (UE) in a wireless communication system is provided. The method may include: receiving resource allocation information including a first start and length indicator value (SLIV) and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and transmitting the uplink signal on the first uplink time resource and the second uplink time resource based on the resource allocation information, wherein S2 is an offset between a last symbol of the first uplink time resource and the start symbol of the second uplink time resource.

In another aspect of the present disclosure, an apparatus for a UE in a wireless communication system is provided. The apparatus may include: at least one processor; and at least one memory operably connected to the at least one processor and configured to store one or more instructions that cause the at least one processor to perform operations including: receiving resource allocation information including a first SLIV and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and transmitting the uplink signal on the first uplink time resource and the second uplink time resource based on the resource allocation information, wherein S2 is an offset between a last symbol of the first uplink time resource and the start symbol of the second uplink time resource.

In another aspect of the present disclosure, a UE configured to transmit an uplink signal in a wireless communication system is provided. The UE may include: at least one transceiver; at least one processor; and at least one memory operably connected to the at least one processor and configured to store one or more instructions that cause the at least one processor to perform operations including: receiving resource allocation information including a first SLIV and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and transmitting the uplink signal on the first uplink time resource and the second uplink time resource based on the resource allocation information, wherein S2 is an offset between a last symbol of the first uplink time resource and the start symbol of the second uplink time resource.

In another aspect of the present disclosure, a computer readable storage medium is provided. The computer readable storage medium may be configured to store at least one computer program including one or more instructions that, when executed by at least one processor, cause the at least one processor to perform operations for a UE. The operations may include: receiving resource allocation information including a first start and length indicator value (SLIV) and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and transmitting the uplink signal on the first uplink time resource and the second uplink time resource based on the resource allocation information, wherein S2 is an offset between a last symbol of the first uplink time resource and the start symbol of the second uplink time resource.

In still another aspect of the present disclosure, a method of receiving an uplink signal by a base station in a wireless communication system is provided. The method may include: transmitting resource allocation information including a first SLIV and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and receiving the uplink signal on the first uplink time resource and the second uplink time resource based on the resource allocation information, wherein S2 is an offset between a last symbol of the first uplink time resource and the start symbol of the second uplink time resource.

In a further aspect of the present disclosure, a base station configured to receive an uplink signal in a wireless communication system is provided. The base station may include: at least one processor; and at least one memory operably connected to the at least one processor and configured to store one or more instructions that cause the at least one processor to perform operations including: transmitting resource allocation information including a first SLIV and a second SLIV, wherein the first SLIV is related to a start symbol S1 of a first uplink time resource and a number of symbols L1 of the first uplink time resource, and the second SLIV is related to an offset S2 related to a start symbol of a second uplink time resource and a number of symbols L2 of the second uplink time resource, where S1 and S2 are integers greater than or equal to 0, and L1 and L2 are integers greater than or equal to 1; and receiving the uplink signal on the first uplink time resource and the second uplink time resource based on the resource allocation information, wherein S2 is an offset between a last symbol of the first uplink time resource and the start symbol of the second uplink time resource.

The resource allocation information may further include a third SLIV. The third SLIV may be related to an offset S3 related to a start symbol of a third uplink time resource and a number of symbols L3 of the third uplink time resource, and S3 may be an offset between a last symbol of the second uplink time resource and the start symbol of the third uplink time resource.

The resource allocation information may further include a slot offset related to the first SLIV without a slot offset related to the second SLIV.

The uplink signal transmission method may further include: receiving one or more pieces of different resource allocation information including a plurality of SLIVs together with the resource allocation information; and receiving a downlink signal including the resource allocation information and information on one piece among the one or more pieces of different resource allocation information.

The resource allocation information may be received through radio resource control (RRC) signaling.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

According to various examples of the present disclosure, a radio communication signal may be efficiently transmitted/received. Accordingly, the overall throughput of the wireless communication system may be improved.

In addition, various services with different requirements may be efficiently supported in a wireless communication system.

Further, delay/latency occurring in wireless communication between communication devices may be reduced.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
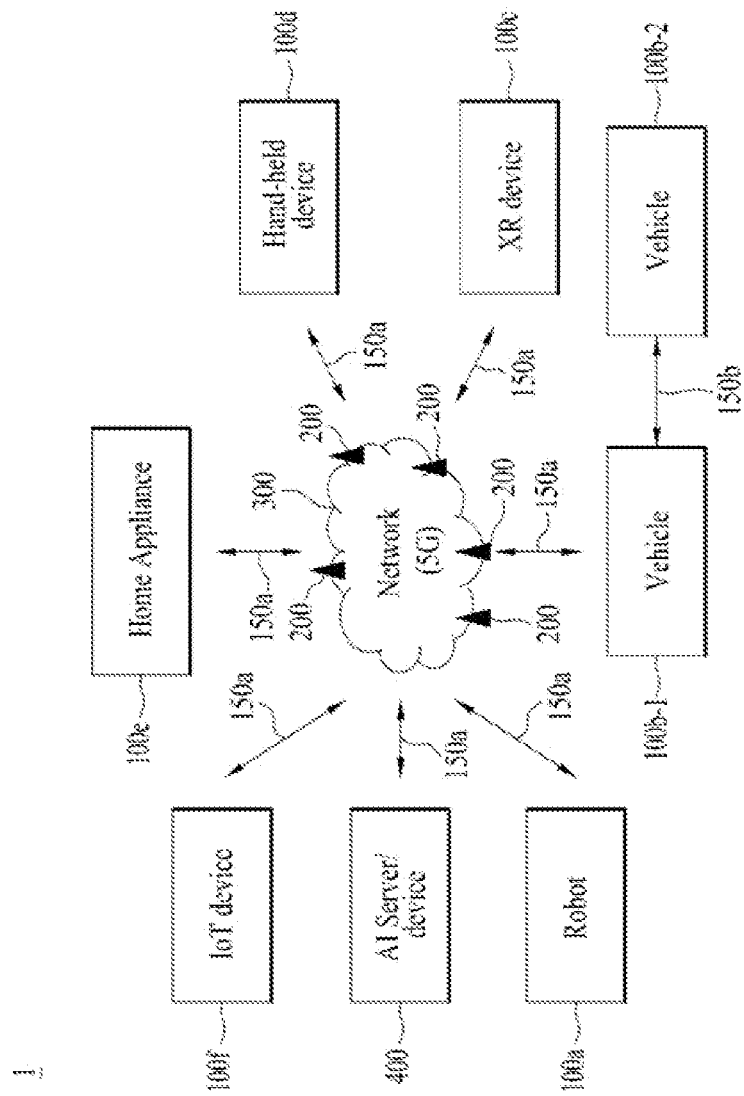
FIG. 1 illustrates a communication system 1 applied to the present disclosure.

Hereinafter, implementations according to the present disclosure will be described in detail with reference to the accompanying drawings. The detailed description set forth below in conjunction with the appended drawings is intended to describe exemplary implementations of the present disclosure and is not intended to represent only implementations for practicing the present disclosure. The following detailed description includes specific details to provide a thorough understanding of the present disclosure. However, one of ordinary skill in the art will recognize that the present disclosure may be practiced without these specific details.

In some cases, well-known structures and devices may be omitted to avoid obscuring the concepts of the present disclosure, or core functions of each structure and device may be shown in in the form of a block diagram. In addition, the same reference numerals are used to describe the same components throughout the present disclosure.

The techniques, devices, and systems described below may be applied to various wireless multiple access systems. Examples of multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system, etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For convenience of description, it is assumed that the present disclosure is applied to a 3GPP based communication system, for example, LTE and NR. However, the technical features of the present disclosure are not limited thereto. For example, although the following detailed description is based on a mobile communication system corresponding to the 3GPP LTE/NR system, it is also applicable to any other mobile communication system except for specific details of 3GPP LTE/NR.

Terms and Technologies not specifically described among terms and Technologies used in the present disclosure may refer to 3GPP LTE standard documents, for example, 3GPP TS 36.211, 3GPP TS 36.212, 3GPP TS 36.213, 3GPP TS 36.321, 3GPP TS 36.300, and 3GPP TS 36.331, etc. and 3GPP NR standard documents, for example, 3GPP TS 38.211, 3GPP TS 38.212, 3GPP TS 38.213, 3GPP TS 38.214, 3GPP TS 38.300, 3GPP TS 38.321, 3GPP TS 38.331, etc.

In the following the examples of the present disclosure, the expression that a device "assumes" may mean that a subject to transmit a channel transmits the channel in accordance with the corresponding "assumption". This may also mean that a subject to receive the channel receives or decodes the channel in accordance with the "assumption" on the premise that the channel is transmitted according to the "assumption".

In the present disclosure, puncturing a channel on a specific resource means that a signal of the channel is mapped to the specific resource in the resource mapping process of the channel, but the signal mapped to the punctured resource is excluded when the channel is transmitted. In other words, the specific resource that is punctured is counted as a resource for the channel in the resource mapping process of the channel, but the signal mapped to the specific resource among signals of the channel is not actually transmitted. Upon receiving the corresponding channel, a receiver may demodulate or decode the channel by assuming that the signal mapped to the punctured specific resource is not transmitted. On the other hand, rate matching of a channel on a specific resource means that the channel is not mapped to the specific resource in the resource mapping process of the channel, and thus the specific resource is not used for transmission of the channel. In other words, the rate matched resource is not counted as a resource for the channel in the resource mapping process of the channel. Upon receiving the corresponding channel, a receiver may demodulates or decode the channel by assuming that the rate matched specific resource is not used for the mapping and transmission of the channel.

In the present disclosure, the UE may be fixed or mobile, and various devices that communicate with a base station (BS) to transmit and/or receive user data and/or various control information belong to this. UE may be referred by Terminal Equipment, MS (Mobile Station), MT (Mobile Terminal), UT (User Terminal), SS (Subscribe Station), wireless device, PDA (Personal Digital Assistant), wireless modem, handheld device, and the like. In addition, in the present disclosure, a BS generally refers to a fixed station that communicates with a UE and/or other BSs, and communicates with the UE and other BSs to exchange various data and control information. BS may be referred to by other terms such as Advanced Base Station (ABS), Node-B (NB), evolved-NodeB (eNB), Base Transceiver System (BTS), Access Point, and Processing Server (PS). In particular, the base station of UTRAN is called Node-B, the base station of E-UTRAN is called eNB, and the base station of new radio access technology network is called gNB. Hereinafter, for convenience of description, a base station is collectively referred to as a BS regardless of a type or version of a communication technology.

In the present disclosure, a node refers to a fixed point capable of transmitting/receiving a radio signal by communicating with the UE. Various types of BSs can be used as nodes regardless of their names. For example, BS, NB, eNB, pico-cell eNB (PeNB), home eNB (HeNB), relay, repeater, etc. may be a node. Also, the node may not need to be a BS. For example, it may be a radio remote head (RRH) or a radio remote unit (RRU). RRH, RRU, and the like generally have a lower power level than that of the BS. The RRH or RRU (hereinafter, RRH/RRU) is generally connected to the BS through a dedicated line such as an optical cable. Therefore, as compared to general cooperative communication by BSs connected by radio lines, cooperative communication by RRH/RRU and BS can be smoothly performed. At least one antenna is installed in one node. The antenna may mean a physical antenna, an antenna port, a virtual antenna, or an antenna group. A node is also called a point.

In the present disclosure, a cell refers to a prescribed geographical area where one or more nodes provide communication services. Accordingly, communication with a specific cell may mean communication with a BS or node that provides communication services to the specific cell. In addition, a DL/UL signal of a specific cell refers to a DL/UL signal from/to a BS or node that provides communication services to the specific cell. A cell that provides UL/DL communication services to a UE is especially called a serving cell. The channel state/quality of a specific cell refers to the channel state/quality of a channel or communication link formed between a UE and a BS or node that provides communication service to the specific cell. In 3GPP based communication systems, a UE may measure the state of a DL channel from a specific node based on cell-specific reference signal(s) (CRS(s)) transmitted on CRS resource(s) and/or channel state information reference signal(s) (CSI-RS(s)) transmitted on CSI-RS resource(s), which are allocated to antenna port(s) of the specific node.

The 3GPP based communication systems employ the concept of a cell to manage radio resources. A cell related to radio resources is different from a cell corresponding to a geographic region.

A "cell" corresponding to a geographic region may be interpreted as coverage where a node is capable of providing services using carriers, and a "cell" related to radio resources may be interpreted as a bandwidth (BW), which is a frequency range configured by the carriers. Since each of DL coverage, a range in which a node is capable of transmitting a valid signal, and UL coverage, a range in which the node is capable of receiving a valid signal from a UE, depends on a carrier carrying each signal, the coverage of the node may be related to the coverage of the "cell" related to radio resources used by the node. Thus, the term "cell" may be used to indicate the service coverage of a node, radio resources, or a range within which a signal using a radio resource may reach with effective strength 3GPP communication standards use the concept of a cell to manage radio resources. A "cell" related to radio resources is defined by a combination of DL resources and UL resources, that is, a combination of DL component carrier(s) (CC(s)) and UL CC(s). The cell may be configured as DL resources only or a combination of DL resources and UL resources. If carrier aggregation (CA) is supported, linkage between the carrier frequency of DL resources (or DL CCs) and the carrier frequency of UL resources (or UL CCs) may be indicated by system information. For example, the combination of DL resources and UL resources may be indicated by system information block type 2 (SIB2) linkage. The carrier frequency may be the same as or different from the center frequency of each cell or CC. If CA is configured, the UE may have one radio resource control (RRC) connection with the network. One serving cell may provide non-access stratum (NAS) mobility information during RRC connection establishment/re-establishment/handover, and one serving cell may provide a security input during RRC connection re-establishment/handover. Such a cell is called a primary cell (Pcell). The Pcell is a cell operating on a primary frequency in which the UE performs an initial connection establishment procedure or initiates a connection re-establishment procedure. Depending on UE capability, secondary cells (Scells) may be configured to form a set of serving cells together with the Pcell. The Scell is a cell that may be configured after RRC connection establishment is completed, and the Scell provides additional radio resources in addition to resources of a special cell (SpCell). A carrier corresponding to the Pcell in DL is referred to as a DL primary CC (DL PCC), and a carrier corresponding to the Pcell in UL is referred to as a UL primary CC (UL PCC). A carrier corresponding to the Scell in DL is referred to as a DL secondary CC (DL SCC), and a carrier corresponding to the Scell in UL is referred to as a UL secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of serving cells related to a master node (e.g., BS) and consists of the SpCell (Pcell) and optionally one or more Scells. When the UE is configured with the DC, the SCG is a subset of serving cells related to a secondary node and consists of the PSCell and zero or more Scells. When the UE in the RRC_CONNECTED state is configured with no CA or DC, there is only one serving cell consisting of only the PCell. When the UE in the RRC_CONNECTED state is configured with CA or DC, the term serving cells refers to a set of cells including SpCell(s) and all Scell(s). In the DC, the UE may be configured with two medium access control (MAC) entities: one MAC entity for the MCG and one MAC entity for the SCG.

When the UE is configured with only CA with no DC, a Pcell PUCCH group consisting of the Pcell and zero or more Scells and a Scell PUCCH group consisting of only Scell(s) may be configured. In the case of the Scell, a Scell in which a PUCCH related to the cell is transmitted may be configured (hereinafter referred to as a PUCCH cell). A Scell in which a PUCCH Scell is indicated belongs to the Scell PUCCH group, and a UCI-related-PUCCH is transmitted on the PUCCH Scell. A Scell in which no PUCCH Scell is indicated or a cell for PUCCH transmission is the Pcell belongs to the Pcell PUCCH group, and the UCI-related-PUCCH is transmitted on the Pcell.

In wireless communication systems, the UE receives information on DL from the BS, and the UE transmits information on UL to the BS. Information transmitted and/or received by the BS and UE may include data and various control information, and various physical channels may be used according to the type/use of information transmitted therebetween.

The 3GPP based communication standards define DL physical channels corresponding to resource elements that carry information originating from higher layers and DL physical signals corresponding to resource elements that are used by physical layers and carry no information originating from higher layers. Link physical signals are defined. For example, a physical downlink shared channel (PDSCH), a physical broadcast channel (PBCH), a physical downlink control channel (PDCCH), and so on are defined as DL physical channels, and a reference signal and a synchronization signal are defined as DL physical signals. A reference signal (RS), which is referred to as a pilot, means a signal with a predefined special waveform known to both the BS and the UE. For example, a demodulation reference signal (DMRS), a CSI-RS, and the like are defined as DL reference signals. The 3GPP based communication standards define UL physical channels corresponding to resource elements that carry information originating from higher layers and UL physical signals corresponding to resource elements that are used by physical layers and carry no information originating from higher layers. For example, a physical uplink shared channel (PUSCH), a physical uplink control channel (PUCCH), and a physical random access channel (PRACH) are defined as UL physical channels, and a DMRS for a UL control/data signal, a sounding reference signal (SRS) used for UL channel measurement, and the like are defined.

In the present disclosure, the PDCCH means a set of time-frequency resources (e.g., resource elements) carrying downlink control information (DCI), and the PDSCH means a set of time-frequency resources carrying DL data. In addition, the PUCCH, PUSCH, and PRACH mean a set of time-frequency resources carrying uplink control information (UCI), UL data, and a random access signal, respectively. Hereinafter, the expression that the UE transmits/receives the PUCCH/PUSCH/PRACH is used in the same meaning as transmitting/receiving the UCI/UL data/random access signal on or over the PUSCH/PUCCH/PRACH, respectively. In addition, the expression that the BS transmits/receives the PBCH/PDCCH/PDSCH is used in the same meaning as transmitting broadcast information/DL data/DCI on or over the PBCH/PDCCH/PDSCH, respectively.

As more and more communication devices require high communication capacity, the need for enhanced mobile broadband (eMBB) enhanced over the legacy radio access technology (RAT) is emerging. In addition, massive MTC (mMTC) capable of providing various services anytime and anywhere by connecting multiple devices and things is one of the major issues to be considered in next-generation communication. A communication system design in consideration of services/UEs sensitive to reliability and latency is being discussed. That is, the introduction of a next-generation RAT in consideration of eMBB, mMTC, and ultra-reliable and low latency communication (URLLC) is being discussed. Currently, 3GPP is conducting a study on a next-generation mobile communication system beyond EPC. In the present disclosure, the corresponding technology is referred to as a new RAT (NR) or 5G RAT, and a system using or supporting NR is referred to as a NR system.

FIG. 1 illustrates a communication system 1 applied to various embodiments of the present disclosure. Referring to FIG. 1, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication. Through the wireless communication/connection 150a and 150b, the wireless device and the BS/wireless device may transmit/receive wireless signals to each other. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
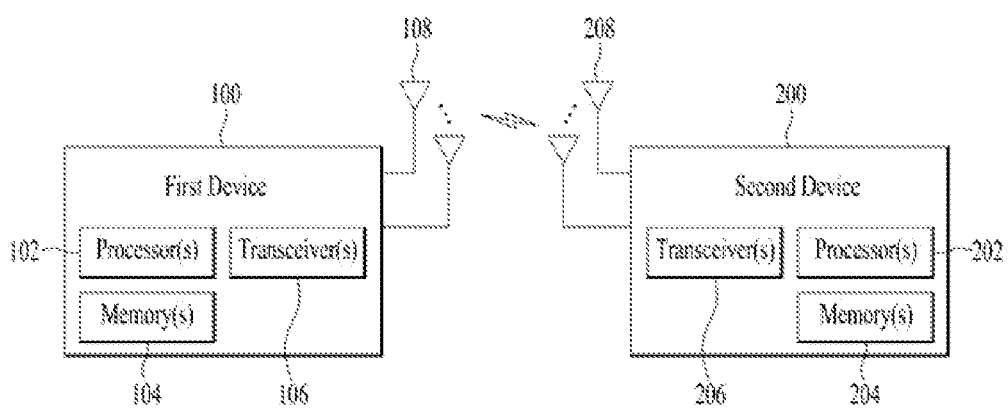
FIG. 2 illustrates example of communication devices performing a method according to the present disclosure.

FIG. 2 is a block diagram illustrating examples of communication devices capable of performing a method according to the present disclosure. Referring to FIG. 2, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
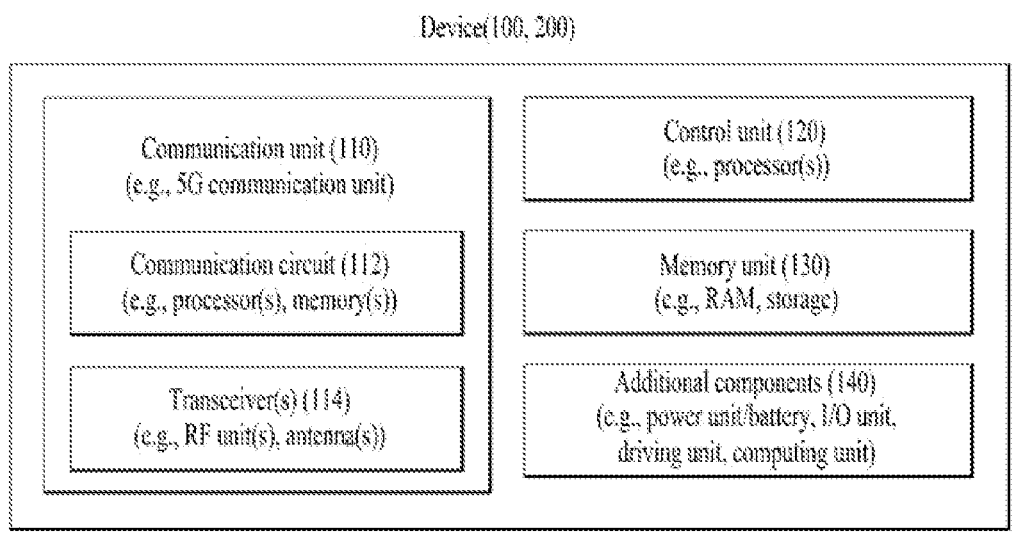
FIG. 3 illustrates another example of a wireless device applied to the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

In the present disclosure, at least one memory (e.g., memory 104 or 204) may be configured store instructions or programs. The instructions or programs, when executed, may cause at least one processor operably connected to the at least one memory to perform operations according to examples or implementations of the present disclosure.

In the present disclosure, a computer-readable storage medium may be configured to store at least one instruction or computer program. The at least one instruction or computer program, when executed by at least one processor, may cause the at least one processor to perform operations according to examples or implementations of the present disclosure.

In the present disclosure, a processing device or apparatus may include at least one processor and at least one computer memory connectable to the at least one processor. The at least one computer memory may be configured to store instructions or programs. The instructions or programs, when executed, may cause the at least one processor operably connected to the at least one memory to perform operations according to examples or implementations of the present disclosure.

Figure 4:
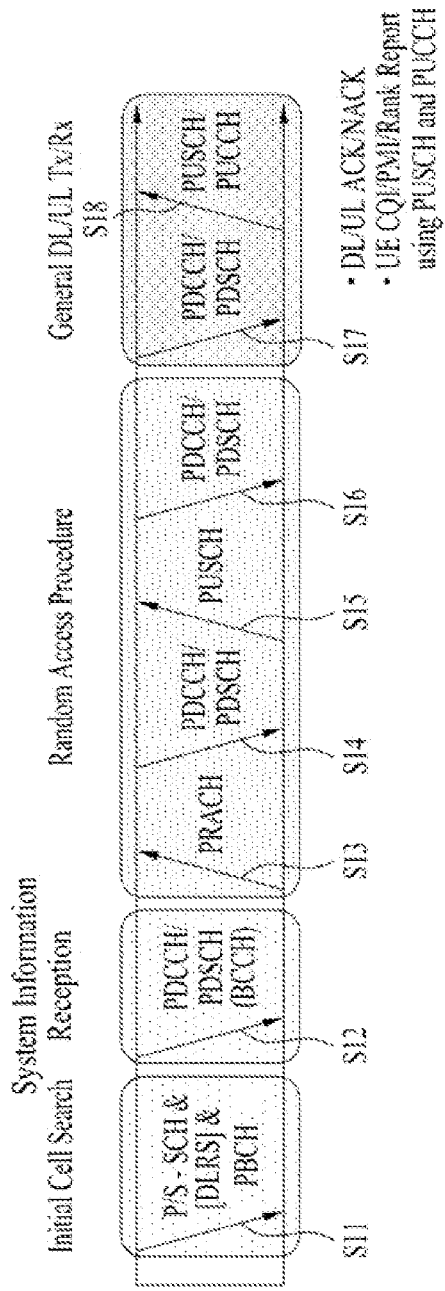
FIG. 4 illustrates physical channels used in a 3rd generation partnership project (3GPP) based communication system, which is an exemplary wireless communication system, and a signal transmission/reception process using the same.

FIG. 4 illustrates physical channels used in a 3GPP based communication system, which is an exemplary wireless communication system, and a signal transmission/reception process using the same.

When a UE is powered on again from the power off state or from a state in which the connection with the wireless communication system is lost, the UE performs an initial cell search procedure such as searching for an appropriate cell to camp on or synchronizing with the cell or a BS of the cell (S11). In the initial cell search procedure, the UE receives a synchronization signal block (SSB) (also called SSB/PBCH block) from the BS. The SSB includes a primary synchronization signal (PSS), a secondary synchronization signal (SSS), and a PBCH. The UE synchronizes with the BS based on the PSS/SSS and acquires information such as a cell identity (ID). Also, the UE may obtain intra-cell broadcast information based on the PBCH. The UE may check the state of a DL channel by receiving a downlink reference signal (DL RS) in the initial cell search procedure.

When completing the initial cell search, the UE may camp on the cell. After camping on the cell, the UE monitors a PDCCH in the cell and receives a PDSCH based on DCI carried by the PDCCH to obtain more specific system information (SI) (S12).

The SI is divided into a master information block (MIB) and a plurality of system information blocks (SIBs). The MIB and SIB will be described in brief.

The MIB includes information/parameters related to reception of system information block type 1 (SystemInformationBlockType1, SIB1) and is transmitted over the PBCH in the SSB. During the initial cell selection, the UE assumes that a half-frame with the SSB is repeated at a cycle of 20 ms. The UE may check whether a control resource set (CORESET) for a Type0-PDCCH common search space exists based on the MIB. The Type0-PDCCH common search space is a type of PDCCH search space and is used to transmit a PDCCH scheduling an SI message. When the Type0-PDCCH common search space exists, the UE may determine based on information in the MIB (e.g., pdcch-ConfigSIB1) (i) a plurality of contiguous RBs and one or more contiguous symbols included in the CORESET and (ii) a PDCCH occasion (i.e., a time domain location for PDCCH reception). When the Type0-PDCCH common search space does not exist, pdcch-ConfigSIB1 provides information about a frequency position in which SSB/SIB1 exists and a frequency range in which SSB/SIB1 does not exist.

SIB1 includes information related to availability and scheduling (e.g., a transmission period, a SI-window size, etc.) of remaining SIBs (hereinafter referred to as SIBx, where x is an integer greater than 1). For example, SIB1 may indicate whether SIBx is periodically broadcast or provided at the request of the UE in an on-demand way. When SIBx is provided in an on-demand way, SIB1 may include information necessary for the UE to perform an SI request. SIB1 is transmitted over the PDSCH. That is, the PDCCH scheduling SIB1 is transmitted in the Type0-PDCCH common search space, and SIB1 is transmitted over the PDSCH indicated by the PDCCH.

SIBx is included in the SI message and transmitted over the PDSCH. Each SI message is transmitted within a periodically occurring time window (i.e., SI-window).

The UE may perform a random access procedure to complete access to the BS (S13 to S16). For example, in the random access procedure, the UE transmits a preamble on a physical random access channel (PRACH) (S13) and receives a random access response (RAR) for the preamble over the PDCCH and the PDSCH related thereto (S14). If the UE fails to receive the RAR, the UE may attempt to retransmit the preamble. In contention based random access, the UE may transmit a PUSCH based on UL resource allocation included in the RAR (S15) and perform a contention resolution procedure including reception of the PDCCH and the PDSCH related thereto (S16).

After performing the above-described procedure, the UE may perform PDCCH/PDSCH reception (S17) and PUSCH/PUCCH transmission (S18) as a general UL/DL signal transmission procedure. Control information transmitted by the UE to the BS is collectively referred to as UCI. The UCI includes hybrid automatic repeat and request acknowledgment/negative-acknowledgment (HARQ ACK/NACK) (also called HARQ-ACK), a scheduling request (SR), CSI, and the like. The CSI may include a channel quality indicator (CQI), a precoding matrix indicator (PMI), and/or a rank indicator (RI). The UCI is generally transmitted over the PUCCH, but the UCI may be transmitted over the PUSCH when control information and traffic data need to be transmitted at the same time. In addition, the UE may aperiodically transmit the UCI over the PUSCH according to the request/instruction of the network.

Figure 5:
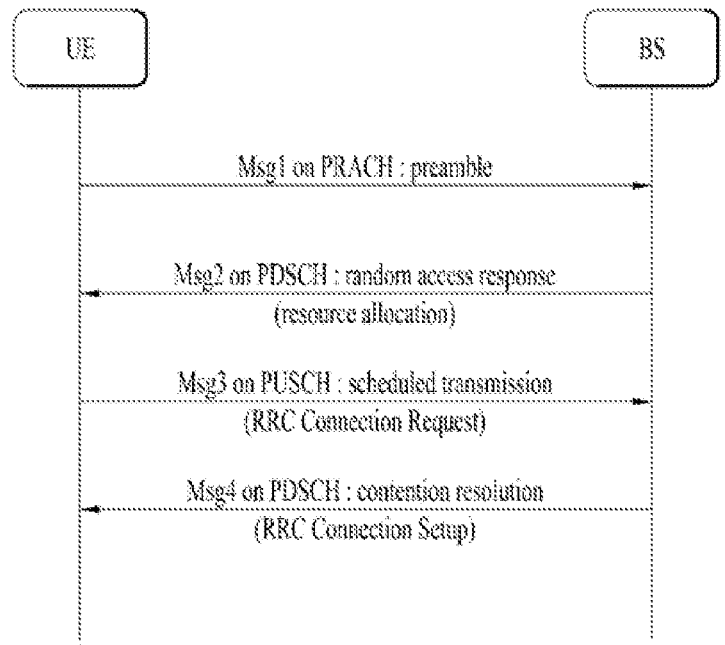
FIG. 5 illustrates a random access procedure applicable to implementation(s) of the present disclosure.
Figure 5:
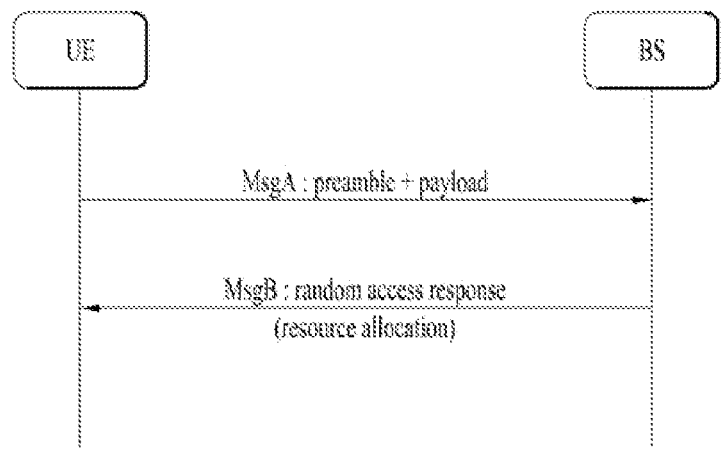

FIG. 5 illustrates a random access procedure applicable to implementation(s) of the present disclosure. Specifically, FIG. 5(a) illustrates a four-step random access procedure, and FIG. 5(b) illustrates a two-step random access procedure.

The random access procedure may be variously used for initial access, UL synchronization adjustment, resource allocation, handover, radio link reconfiguration after radio link failure, positioning, and the like. The random access procedure is classified into a contention-based procedure and a dedicated (i.e., non-contention-based) procedure. The contention-based random access procedure is generally used together with initial access, and the dedicated random access procedure is used in the following cases: handover; when DL data arrives to the network; and when UL synchronization is reconfigured for positioning. In the contention-based random access procedure, the UE randomly selects a random access (RA) preamble. Therefore, a plurality of UEs may transmit the same RA preamble at the same time, which requires the contention resolution procedure. On the other hand, in the dedicated random access procedure, the UE uses a unique RA preamble assigned by the BS to the UE. Accordingly, the UE may perform the random access procedure without collision with other UEs.

Referring to FIG. 5(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives an RAR on a PDSCH from the BS.

Step 3: The UE transmits UL data to the BS on a PUSCH based on the RAR. Here, the UL data includes a Layer 2 message and/or a Layer 3 message.

Step 4: The UE receives a contention resolution message from the BS over the PDSCH.

The UE may receive random access information from the BS through system information. If random access is required, the UE transmits Msg1 (e.g., preamble) to the BS on the PRACH. The BS may identify each random access preamble by a time/frequency resource (RA Occasion (RO)) and a random access preamble index (PI) in which the random access preamble is transmitted. When the BS receives the random access preamble from the UE, the BS sends an RAR message to the UE on the PDSCH. To receive the RAR message, the UE monitors an L1/L2 PDCCH, which is cyclic redundancy check (CRC) masked with a random access radio network temporary identifier (RA-RNTI) including scheduling information for the RAR message, within a preconfigured time window (e.g., ra-ResponseWindow). Upon receiving scheduling information over the PDCCH masked with the RA-RNTI, the UE may receive the RAR message over the PDSCH indicated by the scheduling information. Then, the UE determines whether there is an RAR for the UE in the RAR message. The presence of the RAR for the UE may be checked by the presence of a random access preamble ID (RAPID) related to the preamble transmitted by the UE. The index of the preamble transmitted by the UE may be the same as the RAPID. The RAR may include a random access preamble index, timing offset information for UL synchronization (e.g., timing advance command (TAC), UL scheduling information for Msg3 transmission (e.g., UL grant), and UE temporary identification information (e.g., temporary cell RNTI (TC-RNTI)). Upon receiving the RAR, the UE transmits Msg3 on the PUSCH according to the UL scheduling information and the timing offset value in the RAR. Msg3 may include the ID of the UE (or the global ID of the UE). Msg3 may include RRC connection request related information (e.g., RRCSetupRequest message) for initial access to the network. After receiving Msg3, the BS sends a contention resolution message, Msg4, to the UE. When the UE receives the contention resolution message and succeeds in contention resolution, the TC-RNTI is changed to a cell RNTI (C-RNTI). Msg4 may include the UE ID and/or RRC connection related information (e.g., RRCSetup message). If the information transmitted in Msg3 does not match information received in Msg4 or if Msg4 is not received for a certain period of time, the UE may retransmit Msg3, considering that contention resolution has failed.

On the other hand, the dedicated random access procedure includes the following three steps. Hereinafter, messages transmitted in steps 0 to 2 may be referred to as Msg0 to Msg2, respectively. The BS may trigger the dedicated random access procedure at the UE by using a PDCCH for instructing RA preamble transmission (hereinafter, PDCCH order).

Step 0: The BS allocates an RA preamble to the UE by dedicated signaling.
Step 1: The UE transmits the RA preamble on a PRACH.
Step 2: The UE receives an RAR over a PDSCH from the BS.

Steps 1 to 2 of the dedicated random access process may be the same as steps 1 to 2 of the contention-based random access process.

The NR system may require lower latency than the legacy system. In addition, a four-step random access procedure may be undesirable, especially for services vulnerable to latency such as URLLC. Thus, a low-latency random access procedure may be required for various scenarios of the NR system. When the implementation(s) of the present disclosure are intended to be performed together with the random access procedure, the implementation(s) of the present disclosure may be performed with the following two-step random access procedure in order to reduce latency in the random access procedure.

Referring to FIG. 5(b), the two-step random access procedure may consist of two steps: MsgA transmission from the UE to the BS and MsgB transmission from the BS to the UE. The MsgA transmission may include RA preamble transmission over a PRACH and UL payload transmission over a PUSCH. In the MsgA transmission, the PRACH and PUSCH may be transmitted by time division multiplexing (TDM). Alternatively, in the MsgA transmission, the PRACH and PUSCH may be transmitted by frequency division multiplexing (FDM).

Upon receiving MsgA, the BS may transmit MsgB to the UE. MsgB may include an RAR for the UE.

An RRC connection request related message (e.g., RRCSetupRequest message) requesting to establish a connection between the RRC layer of the BS and the RRC layer of the UE may be included and transmitted in the payload of MsgA. In this case, MsgB may be used to transmit RRC connection related information (e.g., RRCSetup message). Alternatively, the RRC connection request related message (e.g., RRCSetupRequest message) may be transmitted on a PUSCH transmitted based on a UL grant in MsgB. In this case, RRC connection related information (e.g., RRCSetup message) related to the RRC connection request may be transmitted on a PDSCH related to PUSCH transmission based on MsgB after the PUSCH transmission is performed.

Figure 6:
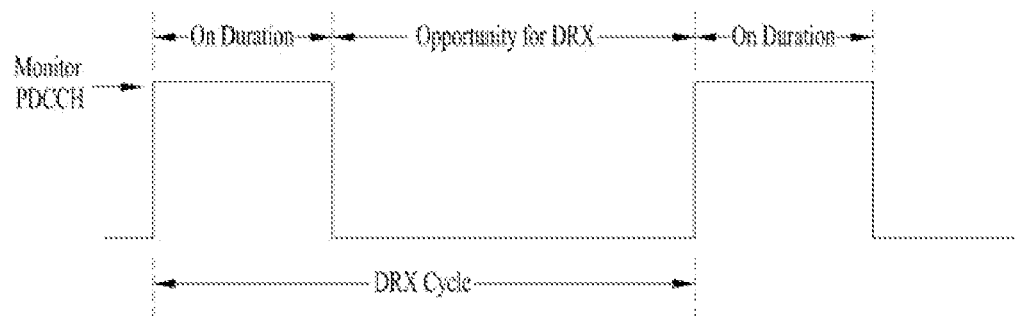
FIG. 6 illustrates a discontinuous reception (DRX) operation applicable to implementation(s) of the present disclosure.

FIG. 6 illustrates a discontinuous reception (DRX) operation applicable to implementation(s) of the present disclosure.

The UE may perform DRX operation while executing the processes and/or methods according to implementation(s) of the present disclosure. When the UE is configured with DRX, the UE may reduce power consumption by receiving DL signals discontinuously. DRX may be performed in RRC_IDLE, RRC_INACTIVE, and RRC_CONNECTED states. In the RRC_IDLE and RRC_INACTIVE states, DRX may be used by the UE to receive paging signals discontinuously. Hereinafter, DRX performed in the RRC_CONNECTED state will be described (RRC_CONNECTED DRX).

FIG. 6 illustrates a DRX cycle when the UE is in the RRC_CONNECTED state. Referring to FIG. 6, a DRX cycle includes an ON duration and an opportunity for DRX. The DRX cycle defines a time interval in which the ON duration is periodically repeated. The ON duration is a time period for which the UE performs PDCCH monitoring to receive a PDCCH. When DRX is configured, the UE performs PDCCH monitoring during the ON duration. If the UE successfully detects any PDCCH during the PDCCH monitoring, the UE starts an inactivity timer and maintains an awake state. On the other hand, if the UE detects no PDCCH during the PDCCH monitoring, the UE enters a sleep state after expiration of the ON duration. Therefore, when DRX is configured, the UE may perform PDCCH monitoring/reception discontinuously in the time domain while performing the processes and/or methods according to implementation(s) of the present disclosure. For example, when DRX is configured, PDCCH reception occasions (e.g., a slot having a PDCCH search space) may be configured to be discontinuous depending on the DRX configuration. On the contrary, when no DRX is configured, the UE may perform PDCCH monitoring/reception continuously in the time domain while performing the processes and/or methods according to implementation(s) of the present disclosure. For example, when no DRX is configured, PDCCH reception occasions (e.g., a slot having a PDCCH search space) may be configured to be continuous. The PDCCH monitoring may not be allowed in a time period corresponding to a measurement gap, regardless of whether DRX is configured.

Table 1 shows UE procedures related to DRX. Referring to Table 1, DRX configuration information may be received by higher layer (RRC) signaling, and DRX ON/OFF may be controlled by a DRX command of the MAC layer. Once DRX is configured, the UE may perform the PDCCH monitoring discontinuously as shown in FIG. 6.

TABLE 1

|  | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following DRX related information.

Value of drx-OnDurationTimer: defines the duration at the beginning of a DRX cycle.

Value of drx-InactivityTimer: defines the duration in which the UE is in the awake state after a PDCCH occasion in which a PDCCH indicating initial UL or DL data is detected.

Value of drx-HARQ-RTT-TimerDL: defines the maximum duration until DL retransmission is received after reception of initial DL transmission.

Value of drx-HARQ-RTT-TimerDL: defines the maximum duration until a grant for UL retransmission is received after reception of a grant for initial UL transmission.

drx-LongCycleStartOffset: defines the duration and starting time of a DRX cycle.

drx-ShortCycle (optional): defines the duration of a short DRX cycle.

When any one of drx-OnDurationTimer, drx-Inactivity-Timer, drx-HARQ-RTT-TimerDL, and drx-HARQ-RTT-TimerDL is running, the UE performs the PDCCH monitoring on each PDCCH occasion while maintaining the awake state.

Figure 7:
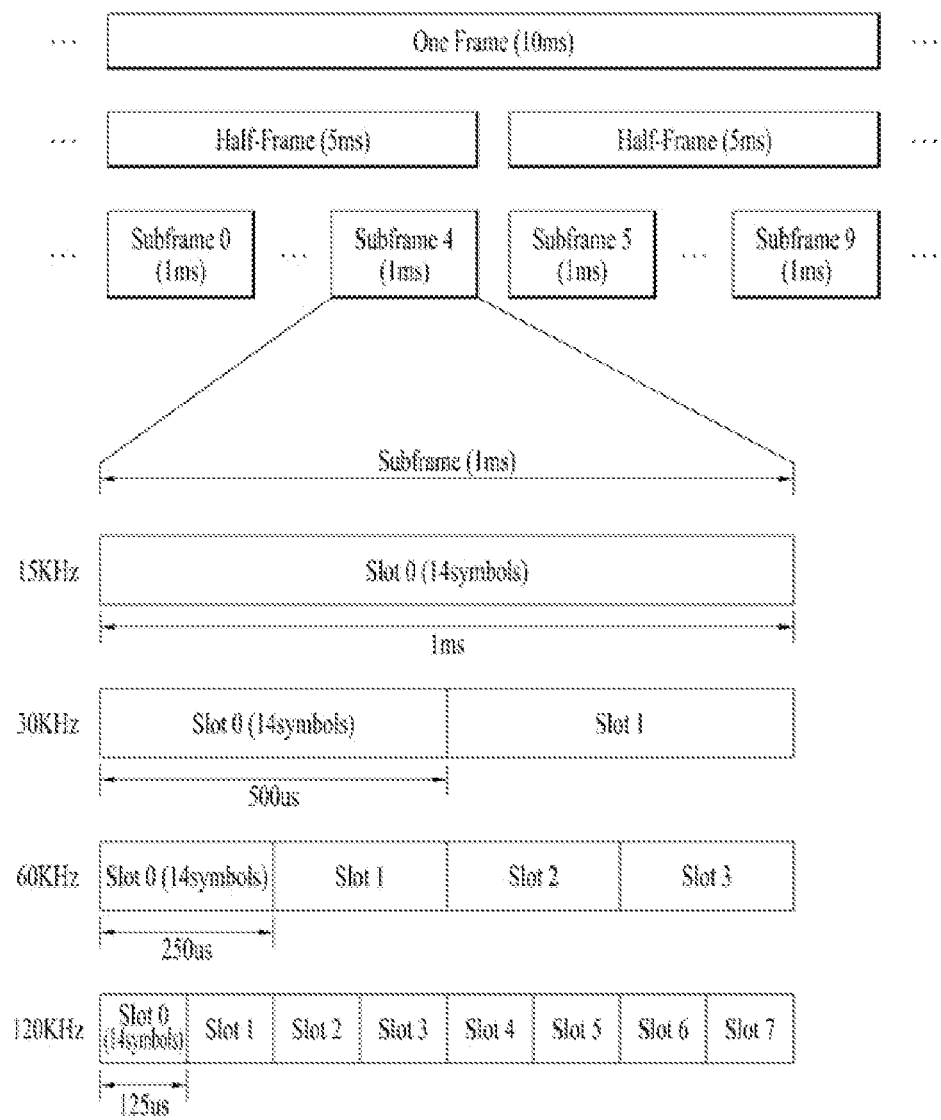
FIG. 7 illustrates an exemplary frame structure available in the 3GPP based wireless communication system.

FIG. 7 illustrates an exemplary frame structure available in the 3GPP based wireless communication system.

The structure of the frame of FIG. 7 is merely exemplary, and the number of subframes, the number of slots, and the number of symbols in the frame may be variously changed. In the NR system, the OFDM numerology (e.g., subcarrier spacing (SCS)) may be set different for a plurality of cells aggregated for one UE. Thus, the (absolute time) duration of a time resource (e.g., subframe, slot, or transmission time interval (TTI)) composed of the same number of symbols may be set different for the aggregated cells. Here, the symbol may include an OFDM symbol (or a cyclic prefix-orthogonal frequency division multiplexing (CP-OFDM) symbol) or an SC-FDMA symbol (or a discrete Fourier transform-spreading-OFDM (DFT-s-OFDM) symbol). In the present disclosure, a symbol, an OFDM-based symbol, an OFDM symbol, a CP-OFDM symbol, and a DFT-s-OFDM symbol may be substituted for each other.

Referring to FIG. 7, UL and DL transmission in the NR system are organized by frames. Each frame has a duration Tf of 10 ms and is divided into two half-frames each having a duration of 5 ms. Each half-frame consists of 5 subframes, and one subframe has a duration Tsf of 1 ms. The subframe is further divided into slots, and the number of slots in a subframe depends on the SCS. Each slot includes 14 or 12 OFDM symbols depending on cyclic prefixes. In a normal cyclic prefix (CP), each slot includes 14 OFDM symbols, and in an extended CP, each slot includes 12 OFDM symbols. The numerology depends on the SCS $\Delta f=2u*15$ kHz, which is exponentially scalable. Table 2 shows the number of OFDM symbols per slot (Nslotsymb), the number of slots per frame (Nframe,uslot) and the number of slots per subframe (Nsubframe,uslot) according to the SCS $\Delta f=2u*15$ kHz for the normal CP. it has been shown

TABLE 2

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 shows the number of OFDM symbols per slot, the number of slots per frame, and the number of slots per subframe according to the SCS $\Delta f=2u*15$ kHz for the extended CP.

TABLE 3

| u | $N^{slot}_{symb}$ | $N^{frame,u}_{slot}$ | $N^{subframe,u}_{slot}$ |
|---|---|---|---|
| 2 | 12 | 40 | 4 |

Figure 8:
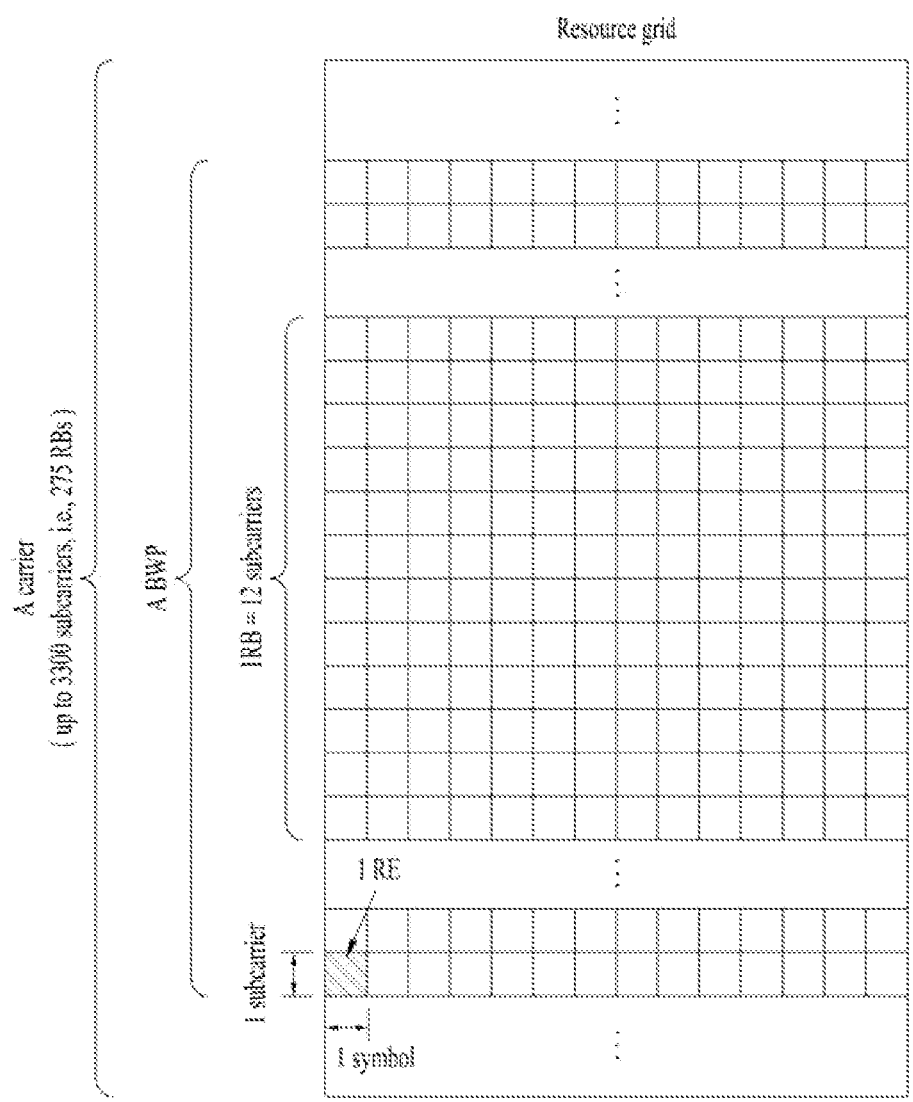
FIG. 8 illustrates a resource grid of slots.

FIG. 8 illustrates a resource grid of slots. A slot includes a plurality of (e.g., 14 or 12) symbols in the time domain. For each numerology (e.g., SCS) and carrier, a resource grid of Nsize,ugrid,x*NRBsc subcarriers and Nsubframe,usymb OFDM symbols is defined, starting at a common resource block (CRB) Nstart,ugrid indicated by higher layer signaling (e.g. RRC signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is typically 12. One resource grid may be present for given antenna port p, SCS configuration u, and transmission direction (DL or UL). The carrier bandwidth Nsize,ugrid for the SCS configuration u is provided by the network to the UE by a higher layer parameter (e.g. RRC parameter). Each element in the resource grid for the antenna port p and SCS configuration u is referred to as a resource element (RE), and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain.

In the NR system, RBs may be classified into CRBs and physical resource blocks (PRBs). CRBs are numbered from 0 upwards in the frequency domain for the SCS configuration u. The center of subcarrier 0 of CRB 0 for the SCS configuration u coincides with 'point A' which serves as a common reference point for RB grids. PRBs are defined within a bandwidth part (BWP) and numbered from 0 to NsizeBWP,i−1, where i is the number of the bandwidth part. The relationship between a physical resource block nPRB in a bandwidth part i and a common resource block nCRB is defined as follows: nPRB=nCRB+NsizeBWP,i, where NsizeBWP,i is a CRB where the bandwidth part starts relative to CRB 0. The BWP includes a plurality of consecutive RBs. A carrier may include a maximum of N (e.g., 5) BWPs. The UE may be configured with one or more BWPs on a given component carrier. Among BWPs configured for the UE, only a predetermined number (e.g., one) of BWPs may be activated on the corresponding carrier. In addition, data communication may be performed in the activated BWP.

If the UE is configured with CA, the UE may be configured to use one or more cells. When the UE is configured to have multiple serving cells, the UE may be configured to have one or multiple cell groups. The UE may be configured to have multiple cell groups associated with different BSs. Alternatively, the UE may be configured to have a plurality of cell groups associated with a single BS. Each cell group of the UE consists of one or more serving cells, and each cell group includes a single PUCCH cell in which PUCCH resources are configured. The PUCCH cell may be a Pcell or an Scell configured as a PUCCH cell among Scells of a cell group. Each serving cell of the UE belongs to one of the cell groups of the UE and does not belong to multiple cell groups.

Figure 9:
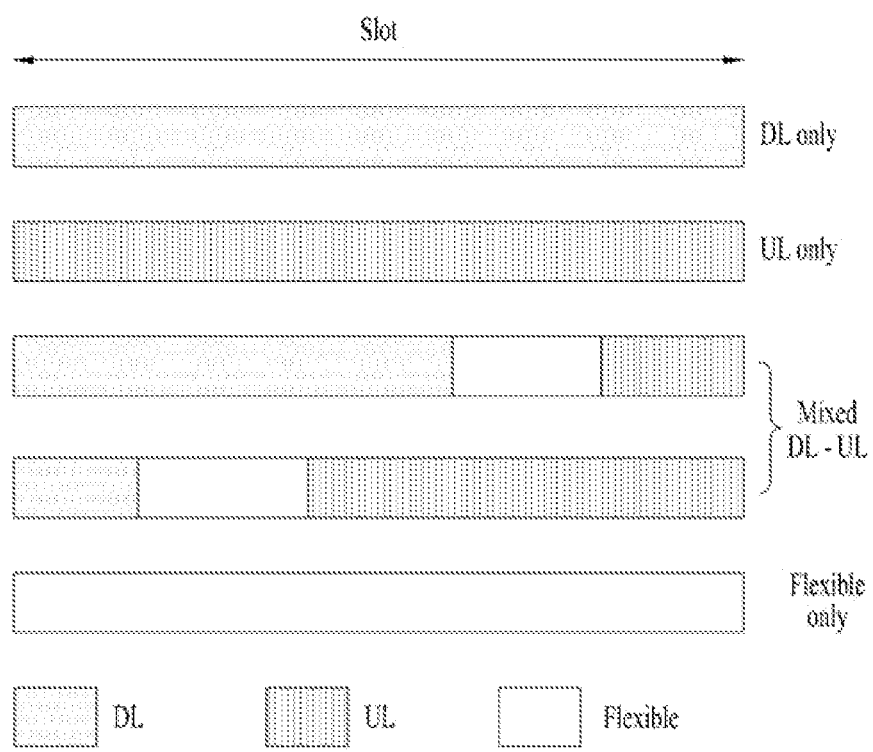
FIG. 9 illustrates slot structures available in the 3GPP based system.

FIG. 9 illustrates slot structures available in the 3GPP based system. In all 3GPP based systems, for example, in the NR systems, each slot has a self-contained structure including i) a DL control channel, ii) DL or UL data, and/or iii) a UL control channel. For example, first N symbols in a slot may be used to transmit a DL control channel (hereinafter, DL control region), and last M symbols in the slot may be used to transmit a UL control channel (hereinafter, UL control region). Each of N and M is a non-negative integer. A resource region (hereinafter, data region) between the DL control region and the UL control region may be used for DL data transmission or UL data transmission. Symbols in a single slot may be divided into DL symbols, UL symbols, and group(s) of consecutive symbols that may be used flexibly. Hereinafter, information indicating how each of the symbols of the slot is used is referred to as a slot format. For example, the slot format may define which symbols in the slot are used for UL and which symbols are used for DL.

When the serving cell operates in TDD mode, the BS may configure a pattern for UL and DL allocation for the serving cell through higher layer (e.g., RRC) signaling. For example, the following parameters may be used to configure the TDD DL-UL pattern:
  dl-UL-TransmissionPeriodicity that provides the period of the DL-UL pattern;
  nrofDownlinkSlots that provides the number of consecutive full DL slots at the beginning of each DL-UL pattern, where the full slot has only DL symbols;
  nrofDownlinkSymbols that provides the number of consecutive DL symbols at the beginning of the slot immediately following the last full DL slot;
  nrofUplinkSlots that provides the number of consecutive full UL slots at the end of each DL-UL pattern, where the full UL slot has only UL symbols; and
  nrofUplinkSymbols that provides the number of consecutive UL symbols at the end of the slot immediately preceding the first full UL slot.

Among the symbols in the DL-UL pattern, the remaining symbols that are not set as either DL symbols or UL symbols are flexible symbols.

Upon receiving a configuration related to the TDD DL-UL pattern, that is, the TDD UL-DL configuration (e.g., tdd-UL-DL-ConfigurationCommon or tdd-UL-DLConfigurationDedicated) through higher layer signaling, the UE sets a slot format for each slot based on the configuration.

On the other hand, various combinations of DL symbols, UL symbols, and flexible symbols are possible for each symbol. However, a predetermined number of combinations may be predefined as slot formats, and the predefined slot formats may be identified by slot format indices. Table 4 shows some of the predefined slot formats. In Table 4, D denotes a DL symbol, U denotes a UL symbol, and F denotes a flexible symbol.

TABLE 4

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | ... | | | | | | | | |

To inform which one of the predefined slot formats is used for a specific slot, the BS may configure a set of slot format combinations applicable to a serving cell for each cell through higher layer (e.g., RRC) signaling for a set of serving cells and instruct the UE to monitor a group-common PDCCH for slot format indicator(s) (SFI(s)) through higher layer (e.g., RRC) signaling. Hereinafter, DCI carried by the group-common PDCCH for SFI(s) is referred to as SFI DCI. DCI format 2_0 is used as the SFI DCI. For example, for each serving cell in the set of serving cells, the BS may provide to the UE the (start) position of a slot format combination ID (i.e., SFI-index) for the serving cell in the SFI DCI, a set of slot format combinations applicable to the corresponding serving cell, and a reference SCS configuration for each slot format in a slot format combination indicated by the SFI-index. One or more slot formats are configured for each slot format combination in the set of slot format combinations, and the slot format combination ID (i.e., SFI-index) is assigned. For example, when the BS intends to configure a slot format combination with N slot formats, the BS may indicate N slot format indices among the slot format indices of the predefined slot formats (see Table 4) for the corresponding slot format combination. The BS informs the UE of an SFI-RNTI, which is an RNTI used for the SFI, and the total length of a DCI payload scrambled with the SFI-RNTI in order to instruct the UE to monitor the group-common PDCCH for SFI(s). If the UE detects the PDCCH based on the SFI-RNTI, the UE may determine slot format(s) for the serving cell from the SFI-index for the serving cell among the SFI-indices in the DCI payload in the PDCCH.

Symbols indicated as flexible by the TDD DL-UL pattern configuration may be indicated as UL, DL or flexible by the SFI DCI. Symbols indicated as DL/UL by the TDD DL-UL pattern configuration are not overridden as UL/DL or flexible by the SFI DCI.

If no TDD DL-UL pattern is configured, the UE determines whether each slot is UL or DL and symbol allocation in each slot based on the SFI DCI and/or DCI scheduling or triggering transmission of DL or UL signals (e.g., DCI format 1_0, DCI format 1_1, DCI format 1_2, DCI format 0_0, DCI format 0_1, DCI format 0_2, and DCI format 2_3).

Hereinafter, physical channels available in the 3GPP based wireless communication system will be described in more detail.

A PDCCH carries DCI. For example, the PDCCH (i.e., DCI) may carry the transmission format and resource allocation of a downlink shared channel (DL-SCH); resource allocation information about an uplink shared channel (UL-SCH); paging information about a paging channel (PCH); system information on a DL-SCH; resource allocation information about a control message from a layer located above the physical layer (hereinafter, higher layer) among protocol stacks of the UE/BS such as an RAR transmitted on a PDSCH; transmit power control command; and activation/deactivation of configured scheduling (CS). The DCI includes a CRC, and the CRC is masked/scrambled with various identifiers (e.g., RNTI) according to the owner or use purpose of the PDCCH. For example, if the PDCCH is for a specific UE, the CRC is masked with a UE ID (e.g., C-RNTI). If the PDCCH is for paging, the CRC is masked with a paging RNTI (P-RNTI). If the PDCCH is for system information (e.g., SIB), the CRC is masked with system information RNTI (SI-RNTI). If the PDCCH is for an RAR, the CRC is masked with RA-RATI.

The PDCCH is transmitted in a CORESET. One or more CORESETs may be configured for the UE. The CORESET has a time duration of 1 to 3 OFDM symbols and includes a set of PRBs. The PRBs included in the CORESET and the CORESET duration may be provided to the UE through higher layer (e.g., RRC) signaling. The UE may monitor a set of PDCCH candidates in the configured CORESET(s) according to the corresponding search space sets. Here, monitoring implies decoding (blind decoding) of each PDCCH candidate based on monitored DCI formats. The set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration.

controlResourceSetId: identifies a CORESET associated with a search space set.

monitoringSlotPeriodicityAndOffset: indicates slots for PDCCH monitoring configured as a periodicity and offset.

monitoringSymbolsWithinSlot: indicates the first symbol(s) for PDCCH monitoring in slots for PDCCH monitoring.

nrofCandidates: indicates the number of PDCCH candidates for each CCE aggregation level.

A PDSCH is a physical layer UL channel for UL data transport. The PDSCH carries DL data (e.g., DL-SCH transport block), and modulation schemes such as Quadrature Phase Shift Keying (QPSK), 16 Quadrature Amplitude Modulation (QAM), 64 QAM, and 256 QAM are applied. A codeword is generated by encoding a transport block (TB). The PDSCH may carry up to two codewords. Scrambling and modulation mapping are performed for each codeword, and modulation symbols generated from each codeword may be mapped to one or more layers. Each layer is mapped to radio resources together with a DMRS so that an OFDM symbol signal is generated and transmitted on a corresponding antenna port.

A PUCCH means a physical layer UL channel for UCI transmission. The PUCCH carries UCI. The UCI includes:

Scheduling request (SR): an SR is information used to request a UL-SCH resource.

Hybrid automatic repeat request acknowledgment (HARQ-ACK): a HARQ-ACK is a response to a DL data packet (e.g., codeword) on a PDSCH. It indicates whether the DL data packet is successfully received by a communication device. A one-bit HARQ-ACK may be transmitted in response to a single codeword, and a two-bit HARQ-ACK may be transmitted in response to two codewords. The HARQ-ACK includes positive ACK (simply, ACK), negative ACK (NACK), DTX or NACK/DTX. Here, the term HARQ-ACK is used interchangeably with HARQ ACK/NACK, ACK/NACK, or A/N.

Channel state information (CSI): CSI is feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), a layer indicator (LI), and the like. The CSI may be classified into CSI part 1 and CSI part 2 according to the type of UCI included in the CSI. For example, the CRI, RI, and/or CQI for the first codeword may be included in CSI part 1, and the LI, PMI, and CQI for the second codeword may be included in CSI part 2.

In the present disclosure, for convenience, PUCCH resources configured and/or indicated by the BS to the UE for transmission of a HARQ-ACK, an SR, and CSI are referred to as a HARQ-ACK PUCCH resource, an SR PUCCH resources, and a CSI PUCCH resources, respectively.

PUCCH formats may be classified as follows according to the UCI payload size and transmission length (e.g., the number of symbols included in a PUCCH resource). Details of the PUCCH formats may also be found in Table 5.

(0) PUCCH Format 0 (PF0, F0)

Supported UCI payload size: up to K bits (e.g. K=2)

Number of OFDM symbols included in single PUCCH: 1 to X symbols (e.g., X=2)

Transmission structure: PUCCH format 0 consists of only a UCI signal with no DMRS, and the UE transmits a UCI state by selecting and transmitting one of a plurality of sequences. For example, the UE transmits specific UCI to the BS by transmitting one of the plurality of sequences on a PUCCH with PUCCH format 0. The UE transmits a PUCCH with PUCCH format 0 on a PUCCH resource for configuring a positive SR only when transmitting the corresponding SR.

The configuration for PUCCH format 0 includes the following parameters for the corresponding PUCCH resource: the index for an initial cyclic shift, the number of symbols for PUCCH transmission, and the first symbol for the PUCCH transmission.

(1) PUCCH Format 1 (PF1, F1)

Supported UCI payload size: up to K bits (e.g. K=2)
Number of OFDM symbols included in single PUCCH: Y to Z symbols (e.g., Y=4 and Z=14)
Transmission structure: A DMRS and UCI are configured/mapped to different OFDM symbols by TDM. That is, the DMRS is transmitted in a symbol where modulation symbols are not transmitted. The UCI is expressed by multiplying a specific sequence (e.g., orthogonal cover code (OCC)) by a modulation (e.g., QPSK) symbol. By applying a cyclic shift (CS)/OCC to both the UCI and DMRS, code division multiplexing (CDM) is supported between multiple PUCCH resources (in the same RB) (according to PUCCH format 1). PUCCH format 1 carries UCI with a maximum size of two bits, and modulation symbols are spread by the OCC in the time domain (where the OCC is configured differently depending on whether frequency hopping is performed).
The configuration for PUCCH format 1 includes the following parameters for the corresponding PUCCH resource: the index for an initial cyclic shift, the number of symbols for PUCCH transmission, the first symbol for the PUCCH transmission, the index for the OCC.

(2) PUCCH Format 2 (PF2, F2)

Supported UCI payload size: more than K bits (e.g. K=2)
Number of OFDM symbols included in single PUCCH: 1 to X symbols (e.g. X=2)
Transmission structure: A DMRS and UCI are configured/mapped to the same symbol by FDM. The UE transmits by applying only an IFFT with no DFT to coded UCI bits. PUCCH format 2 carries UCI with a bit size larger than K bits, and modulation symbols are transmitted by FDM with the DMRS. For example, the DMRS is located at symbol indices #1, #4, #7, and #10 in a given RB with a density of 1/3. A pseudo noise (PN) sequence is used as the DMRS sequence. Frequency hopping may be enabled for 2-symbol PUCCH format 2.
The configuration for PUCCH format 2 includes the following parameters for the corresponding PUCCH resource: the number of PRBs, the number of symbols for PUCCH transmission, and the first symbol for the PUCCH transmission.

(3) PUCCH Format 3 (PF3, F3)

Supported UCI payload size: more than K bits (e.g. K=2)
Number of OFDM symbols included in single PUCCH: Y to Z symbols (e.g. Y=4, Z=14)
Transmission structure: A DMRS and UCI are configured/mapped to different symbols by TDM. The UE transmits by applying a DFT to coded UCI bits. PUCCH format 3 does not support UE multiplexing on the same time-frequency resource (e.g., the same PRB).
The configuration for PUCCH format 3 includes the following parameters for the corresponding PUCCH resource: the number of PRBs, the number of symbols for PUCCH transmission, and the first symbol for the PUCCH transmission.

(4) PUCCH Format 4 (PF4, F4)

Supported UCI payload size: more than K bits (e.g. K=2)
Number of OFDM symbols included in single PUCCH: Y to Z symbols (e.g. Y=4, Z=14)
Transmission structure: A DMRS and UCI are configured/mapped to different symbols by TDM. PUCCH format 4 may multiplex up to four UEs in the same PRB by applying an OCC in the front end of a DFT and applying a CS (or interleaved FDM (IFDM) mapping) to the DMRS. In other words, UCI modulation symbols are transmitted by TDM with the DMRS.
The configuration for PUCCH format 4 includes the following parameters for the corresponding PUCCH resource: the number of symbols for PUCCH transmission, the length of the OCC, the index for the OCC, and the first symbol for the PUCCH transmission.

Table 5 shows PUCCH formats. The PUCCH formats may be divided into short PUCCH formats (format 0 and 2) and long PUCCH formats (format 1, 3, and 4) depending on the PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

The PUCCH resource may be determined for each UCI type (e.g., A/N, SR, CSI, etc.). The PUCCH resource used for UCI transmission may be determined based on the UCI (payload) size. For example, the BS may configure a plurality of PUCCH resource sets to the UE, and the UE may select a specific PUCCH resource set with a specific range depending on the range of the UCI (payload) size (e.g., the number of UCI bits). For example, the UE may select one of the following PUCCH resource sets depending on the number of UCI bits (NUCI).

PUCCH resource set #0 if the number of UCI bits=<2
PUCCH resource set #1 if the 2<number of UCI bits=<N1
...
PUCCH resource set #(K−1) if NK−2<number of UCI bits=<NK−1

K is the number of PUCCH resource sets (K>1), and Ni is the maximum number of UCI bits supported by PUCCH resource set #i. For example, PUCCH resource set #1 may be configured with resources of PUCCH formats 0 to 1, and other PUCCH resource sets may be configured with resources of PUCCH formats 2 to 4 (see Table 5).

The configuration for each PUCCH resource includes the index of a PUCCH resource, the index of a start PRB, and the configuration for one of PUCCH formats 0 to 4. The BS may configure for the UE a code rate for multiplexing HARQ-ACK, SR and CSI report(s) on PUCCH transmission using PUCCH format 2, PUCCH format 3, or PUCCH format 4 through a higher layer parameter maxCodeRate. The higher layer parameter maxCodeRate is used to determine how to feed back UCI on PUCCH resources for PUCCH format 2, 3 or 4.

When the UCI type is an SR or CSI, a PUCCH resource to be used for UCI transmission in a PUCCH resource set may be configured to the UE by the network through higher layer signaling (e.g., RRC signaling). When the UCI type is a HARQ-ACK for a semi-persistent scheduling (SPS)

PDSCH, a PUCCH resource to be used for UCI transmission in a PUCCH resource set may be configured to the UE by the network through higher layer signaling (e.g., RRC signaling). On the other hand, when the UCI type is a HARQ-ACK for a PDSCH scheduled by DCI, a PUCCH resource to be used for UCI transmission in a PUCCH resource set may be scheduled by the DCI.

In the case of DCI-based PUCCH resource scheduling, the BS transmits DCI to the UE on a PDCCH. In addition, the BS may indicate a PUCCH resource to be used for UCI transmission in a specific PUCCH resource set through an ACK/NACK resource indicator (ARI) in the DCI. The ARI is used to indicate a PUCCH resource for ACK/NACK transmission, and the ARI may be referred to as a PUCCH resource indicator (PRI). Here, DCI may be used for PDSCH scheduling, and UCI may include a HARQ-ACK for a PDSCH. On the other hand, the BS may configure to the UE a PUCCH resource set consisting of more PUCCH resources than the number of states indicated by the ARI through a (UE-specific) higher layer (e.g., RRC) signal. In this case, the ARI indicates a PUCCH resource subset in the PUCCH resource set. Which PUCCH resource is used in the indicated PUCCH resource subset may be determined according to an implicit rule, which is based on transmission resource information about the PDCCH (e.g., the index of a start control channel element (CCE) of the PDCCH, etc.).

A PUSCH carries UL data (e.g., UL-SCH TB) and/or UCI. The PUSCH is transmitted based on a CP-OFDM waveform or a DFT-s-OFDM waveform. When the PUSCH is transmitted based on the DFT-s-OFDM waveform, the UE transmits the PUSCH by applying transform precoding. For example, when the transform precoding is not possible (e.g., when the transform precoding is disabled), the UE may transmit the PUSCH based on the CP-OFDM waveform. When the transform precoding is possible (e.g., when the transform precoding is enabled), the UE may transmit the PUSCH based on the CP-OFDM waveform or DFT-s-OFDM waveform. PUSCH transmission may be dynamically scheduled by a UL grant in DCI or semi-statically scheduled by higher layer (e.g., RRC) signaling (and/or layer 1 (L1) signaling (e.g., PDCCH)). Both codebook based PUSCH transmission and non-codebook based PUSCH transmission may be allowed.

The UE needs to have UL resources available to the UE for UL-SCH data transmission and DL resources available to the UE for DL-SCH data reception. Such UL resources and DL resources are assigned to the UE through resource allocation by the BS. The resource allocation may include time domain resource allocation (TDRA) and frequency domain resource allocation (FDRA). In the present disclosure, UL resource allocation is also referred to as a UL grant, and DL resource allocation is also referred to as DL assignment. The UE may dynamically receive the UL grant on a PDCCH or in an RAR, or the UE may be semi-persistently configured with the UL grant through RRC signaling from the BS. The UE may dynamically receive the DL assignment on a PDCCH, or the UE may be semi-persistently configured with the DL assignment through RRC signaling from the BS.

In UL, the BS may dynamically allocate UL resources to the UE over PDCCH(s) addressed to a C-RNTI. The UE monitors the PDCCH(s) to discover possible UL grant(s) for UL transmission. In addition, the BS may allocate UL resources using a grant configured to the UE. Two types of configured grants: type 1 and type 2 may be used. In the case of type 1, the BS may directly provide a configured UL grant (including the periodicity) through RRC signaling. In case of type 2, the BS may configure the periodicity of an RRC configured UL grant through RRC signaling and signal and activate/deactivate the configured UL over a PDCCH addressed to a configured scheduling RNTI (CS-RNTI). For example, in the case of type 2, the PDCCH addressed to the CS-RNTI indicates that the corresponding UL grant may be implicitly reused according to the periodicity configured by the RRC signaling until the UL grant is deactivated.

In DL, the BS may dynamically allocate DL resources to the UE over PDCCH(s) addressed with a C-RNTI. The UE monitors the PDCCH(s) to discover possible DL assignments. In addition, the BS may allocate DL resources to the UE through semi-static (or semi-persistent) scheduling (SPS). The BS may configure the periodicity of the configured DL assignments through RRC signaling and signal and activate/deactivate the configured DL assignments over a PDCCH addressed to a CS-RNTI. For example, the PDCCH addressed to the CS-RNTI indicates that the corresponding DL assignments may be implicitly reused according to the periodicity configured by the RRC signaling until they are deactivated.

Hereinafter, resource allocation by a PDCCH and resource allocation by RRC will be described in detail.

*Resource Allocation by PDCCH: Dynamic Grant/Assignment

The PDCCH may be used to schedule DL transmission on a PDSCH or UL transmission on a PUSCH. DCI on the PDCCH scheduling DL transmission may include a DL resource assignment including at least a modulation and coding format (e.g., modulation and coding scheme (MCS) index (IMCS)), resource allocation, and HARQ information related to a DL-SCH. DCI on the PDCCH scheduling UL transmission may include a UL scheduling grant including at least a modulation and coding format, resource allocation, and HARQ information related to a UL-SCH. The size and usage of DCI carried by one PDCCH may vary depending on DCI formats. For example, DCI format 0_0, DCI format 0_1, or DCI format 0_2 may be used for PUSCH scheduling, and DCI format 1_0, DCI format 1_1, or DCI format 1_2 may be used for PDSCH scheduling. In particular, DCI format 0_2 and DCI format 1_2 may be used to schedule transmission with higher transmission reliability and lower latency requirements than those guaranteed by DCI format 0_0, DCI format 0_1, DCI format 1_0, and DCI format 1_1. Some implementations of the present disclosure may be applied to UL data transmission based on DCL format 0_2. Some implementations of the present disclosure may be applied to DL data reception based on DCI format 1_2.

Figure 10:
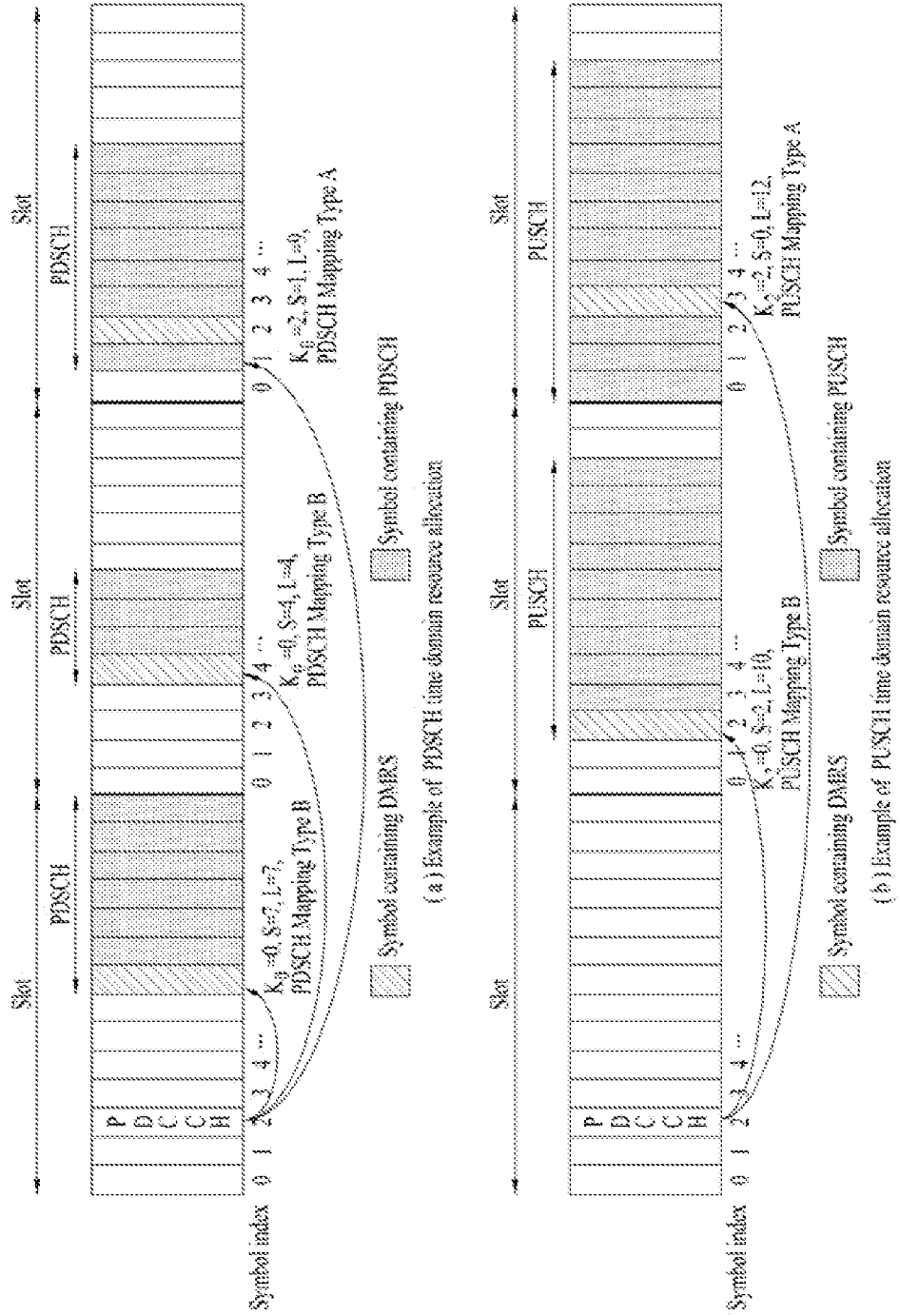
FIG. 10 illustrates an example of physical downlink shared channel (PDSCH) time domain resource allocation and physical uplink shared channel (PUSCH) time domain resource allocation by a physical downlink control channel (PDCCH).

FIG. 10 illustrates an example of PDSCH time domain resource allocation and PUSCH time domain resource allocation by a PDCCH.

DCI carried by a PDCCH to schedule a PDSCH or PUSCH includes a time domain resource assignment (TDRA) field. The TDRA field provides a value m for a row index m+1 into an allocation table for the PDSCH or PUSCH. Predefined default PDSCH time domain allocation is applied as the allocation table for the PDSCH, or a PDSCH time domain resource allocation table configured by the BS through RRC signaling pdsch-TimeDomainAllocationList is applied as the allocation table for the PDSCH. Predefined default PUSCH time domain allocation is applied as the allocation table for the PDSCH, or a PUSCH time domain resource allocation table configured by the BS through RRC signaling pusch-TimeDomainAllocationList is applied as the allocation table for the PUSCH. The PDSCH time domain resource allocation table to be applied and/or the PUSCH time domain resource allocation table to be applied may be determined according to fixed/predefined rules (see 3GPP TS 38.214).

In PDSCH time domain resource configurations, each indexed row defines a DL assignment-to-PDSCH slot offset K0, a start and length indicator (SLIV) (or the start position of the PDSCH in a slot (e.g., start symbol index S) and the allocation length thereof (e.g., the number of symbols L)), and a PDSCH mapping type. In PUSCH time domain resource configurations, each indexed row defines a UL grant-to-PUSCH slot offset K2, the start position of the PUSCH in a slot (e.g., start symbol index S) and the allocation length thereof (e.g., the number of symbols L), and a PUSCH mapping type. K0 for the PDSCH denotes the difference between a slot including the PDCCH and a slot including the PDSCH related to the PDCCH, and K2 for the PUSCH denotes the difference between the slot including the PDCCH and a slot including the PUSCH related to the PDCCH.

The SLIV is a joint indication of the start symbol S relative to the start of the slot including the PDSCH or PUSCH and the number L of consecutive symbols counted from the symbol S. There are two PDSCH/PUSCH mapping types: one is mapping type A and the other is mapping type B. In the case of PDSCH/PUSCH mapping type A, a DMRS is located in the third symbol (symbol #2) or the fourth symbol (symbol #3) in a slot according to RRC signaling. In case of PDSCH/PUSCH mapping type B, a DMRS is located in the first symbol allocated for the PDSCH/PUSCH.

The scheduling DCI includes a frequency domain resource assignment (FDRA) field that provides assignment information on RBs used for the PDSCH or PUSCH. For example, the FDRA field provides to the UE information about a cell for PDSCH or PUSCCH transmission, information about a BWP for PDSCH or PUSCH transmission, and information about RBs for PDSCH or PUSCH transmission.

*Resource Allocation by RRC

As described above, there are two types of transmission with no dynamic grant in UL: configured grant type 1 and configured grant type 2. In configured grant type 1, a UL grant is provided by RRC signaling and stored as the configured grant. In configured grant type 2, a UL grant is provided by a PDCCH, and the UL grant is stored as the configured UL grant or cleared depending on L1 signaling indicating activation or deactivation of the configured UL grant. Type 1 and type 2 may be configured by RRC signaling for each serving cell and for each BWP. Multiple configurations may be simultaneously activated in different serving cells.

When configured grant type 1 is configured, the UE may receive the following parameters from the BS through RRC signaling:
  cs-RNTI that provides a CS-RNTI for retransmission;
  periodicity that provides the periodicity of configured grant type 1;
  timeDomainOffset that indicates a resource offset for system frame number (SFN)=0 in the time domain;
  timeDomainAllocation value m that provides a row index m+1 pointing to an allocation table, which indicates a combination of the start symbol S, length L, and PUSCH mapping type;
  frequencyDomainAllocation that provides frequency domain resource allocation; and
  mcsAndTBS that provides an IMCS indicating a modulation order, a target code rate, and a TB size.

When configuration grant type 1 is configured for a serving cell by RRC, the UE stores a UL grant provided by RRC as the configured UL grant for the indicated serving cell and perform initialization or re-initialization so that the UL grant starts in the symbol and recurs at the periodicity according to timeDomainOffset and S (derived from SLIV). After the UL grant is configured for configured grant type 1, the UE may consider that the UL grant recurs in each symbol satisfying the following: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where, numberOfSlotsPerFrame and numberOfSymbolsPerSlot denote the number of consecutive slots per frame and the number consecutive OFDM symbols per slot, respectively (see Tables 2 and 3).

When configured grant type 2 is configured, the UE may receive the following parameters from the BS through RRC signaling:
  cs-RNTI that provides a CS-RNTI for activation, deactivation, and retransmission; and
  periodicity that provides the periodicity of configured grant type 2.

The actual UL grant is provided to the UE by the PDCCH (addressed to the CS-RNTI). After the UL grant is configured for configured grant type 2, the UE may consider that the UL grant recurs in each symbol that satisfies the following:
[(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+slotstart time*numberOfSymbolsPerSlot+symbolstart time)+N*periodicity] modulo (1024*numberOfSlotsPerFrame*numberOfSymbolsPerSlot), for all N>=0, where SFNstart time, slotstart time, and symbolstart time denote the SFN, slot, and symbol of the first transmission opportunity of the PUSCH after the configured grant is (re-)initialized, respectively, and numberOfSlotsPerFrame and numberOfSymbolsPerSlot denote the number of consecutive slots per frame and the number of consecutive OFDM symbols per slot respectively (see Tables 2 and 3).

In DL, the UE may be configured with SPS for each serving cell and for each BWP through RRC signaling from the BS. In the case of DL SPS, a DL assignment may be provided to the UE over a PDCCH and be stored or cleared based on L1 signaling indicating SPS activation or deactivation. When the SPS is configured, the UE may receive the following parameters from the BS through RRC signaling:
  cs-RNTI that provides a CS-RNTI for activation, deactivation, and retransmission;
  nrofHARQ-Processes that provides the number of configured HARQ processes for the SPS;
  periodicity that provides the periodicity of the DL assignment configured for the SPS.

After the DL assignment is configured for the SPS, the UE may consider that an N-th DL assignment sequentially occurs in a slot satisfying the following: (numberOfSlotsPerFrame*SFN+slot number in the frame)=[(numberOfSlotsPerFrame*SFNstart time+slotstart time)+N*periodicity*numberOfSlotsPerFrame/10] modulo (1024*numberOfSlotsPerFrame), where SFNstart time and slotstart time denote the SFN and slot of the first transmission opportunity of the PDSCH after the configured DL assignment is (re-)initialized, respectively, and numberOfSlotsPerFrame and numberOfSymbolsPerSlot denote the number of consecutive slots per frame and the number of consecutive OFDM symbols per slot, respectively (see Tables 2 and 3).

If the CRC of a DCI format is scrambled with a CS-RNTI provided by the RRC parameter cs-RNTI and if the new data indicator field for an enabled TB is set to 0, the UE may validate a DL SPS assignment PDCCH or a configured UL grant type 2 PDCCH for scheduling activation or scheduling release. If all fields for the DCI format are set according to Table 6 or 7, validation of the DCI format is achieved. Table 6 shows special fields for DL SPS and UL grant type 2 scheduling activation PDCCH validation, and Table 7 shows special fields for DL SPS and UL grant type 2 scheduling release PDCCH validation.

TABLE 6

| | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

The actual DL or UL assignment for DL SPS or UL grant type 2 and the corresponding MCS may be provided by resource assignment fields (e.g., the TDRA field providing the TDRA value m, the FDRA field providing the frequency RB allocation, and the MCS field) in the DCI format carried by the corresponding DL SPS or UL grant type 2 scheduling activation PDCCH. If validation is achieved, the UE considers information in the DCI format as valid activation or valid release of the DL SPS or configured UL grant type 2.

Figure 11:
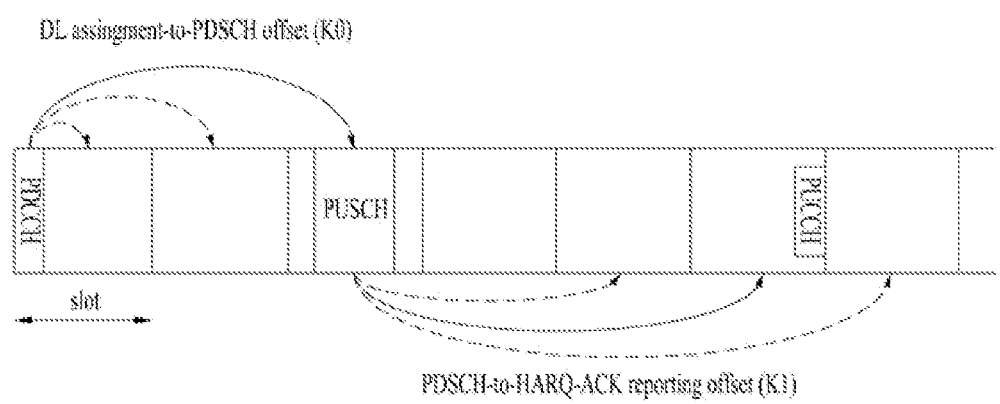
FIG. 11 illustrates a hybrid automatic repeat request acknowledgement (HARQ-ACK) transmission/reception process.

FIG. 11 illustrates a HARQ-ACK transmission/reception process.

Referring to FIG. 11, the UE may detect a PDCCH in slot n. Thereafter, the UE may receive a PDSCH in slot n+K0 according to the scheduling information received over the PDCCH in slot n and then transmit UCI over a PUCCH in slot n+K1. Here, the UCI includes a HARQ-ACK response for the PDSCH. When the PDSCH is configured to be transmitted in a maximum of one TB, the HARQ-ACK response may include one bit. When the PDSCH is configured to transmit in a maximum of two TBs, the HARQ-ACK response may include two bits if no spatial bundling is configured. Alternatively, if spatial bundling is configured, the HARQ-ACK response may include one bit. When the HARQ-ACK transmission times for a plurality of PDSCHs are designated as slot n+K1, the UCI transmitted in slot n+K1 may include HARQ-ACK responses for the plurality of PDSCHs.

For services with strict latency and reliability requirements (e.g., URLLC service), the reliability of PUSCH/PDSCH transmission may need to be improved. To improve the reliability of the PUSCH/PDSCH transmission, repeated PUSCH/PDSCH transmission may be considered. For example, the BS may configure the UE to the repeated PUSCH/PDSCH transmission in K consecutive slots, and the UE may repeat TB transmission/reception in each slot over the K consecutive slots. In some examples or implementations of the present disclosure, the same symbol allocation may be applied across the K consecutive slots. In other words, the start symbol index and the number of symbols for the PUSCH/PDSCH may be the same for each of the K consecutive slots. When the same resource allocation is used for the repeated PUSCH/PDSCH transmission, the reliability or coverage of the PUSCH/PDSCH transmission may be improved. However, if the same resources are allocated to the PUSCH/PDSCH in the consecutive slots for the repeated PUSCH/PDSCH transmission, it may disturb flexible resource allocation. In addition, when the UE needs to perform PDCCH reception and PUSCH transmission within one slot to satisfy latency requirements, only few symbols in the latter half of the slot may be available for the PUSCH transmission. As a result, the repeated transmission may be delayed to a slot after the slot. In this case, if the UE needs to perform the repeated transmission more than a certain number of times to secure the reliability, there may be significant latency in the corresponding PUSCH/PDSCH transmission/reception. Therefore, to achieve flexible and efficient use of resources and fast and robust UL channel transmission, the PUSCH/PDSCH transmission needs to be repeated at intervals smaller than one slot in such a way that a plurality of PUSCHs/PDSCHs are transmitted in one slot. Alternatively, the PUSCH/PDSCH needs to be transmitted regardless of the slot boundary. If a plurality of PUSCH/PDSCHs are transmitted in one slot, frequency hopping in which frequency resources vary between PUSCH transmission and PDSCH transmission may be additionally considered to secure reliability by frequency diversity.

The PUSCH/PDSCH repetition may be applied to PUSCH/PDSCH transmission based on a configured grant as well as PUSCH/PDSCH transmission based on a dynamic UL grant/DL assignment in a PDCCH. In some examples or implementations of the present disclosure, for the PUSCH/PDSCH transmission based on the configured grant, resource allocation for one TB is always determined within one period of the configured grant. For example, the time duration for transmission of K repetitions for one TB does not exceed the time duration derived by the periodicity P of the configured grant. When the repeated transmission is performed based on the configured grant, the repeated transmission needs to be performed on the same resources in each of the consecutive slots to obtain sufficient reliability. In some examples/implementations of the present invention, the UE transmits/receives the PUSCH/PDSCH only at locations determined according to a redundancy version (RV) sequence among a plurality of PUSCH/PDSCH resources within the periodicity of the configured grant. For example, in some examples/implementations, if the configured RV sequence is {0, 2, 3, 1}, the UE performs initial TB transmission on the first transmission occasion (TO) among K TOs for the K repetitions. In this case, it may be necessary to secure a long period of time in order to secure the reliability of the PUSCH/PDSCH transmission, or it may be difficult to configure a short period to use a plurality of PUSCH resources. In particular, when the TB transmission starts in the middle of multiple PUSCH/PDSCH resources within the periodicity of the configured grant, that is, in a middle TO among TOs, it may be difficult to perform the repetition a sufficient number of times.

Since the periodicity of the configured grant is closely related to the latency of the PUSCH/PDSCH, it needs to be allowed to use the configured grant with a short periodicity, regardless of the transmission length of the PUSCH/PDSCH (e.g., the number of symbols occupied by the PUSCH/PDSCH). Alternatively, transmission also needs to be repeated a sufficient number of times even when the TB transmission starts from an intermediate PUSCH/PDSCH resource in the time domain among a plurality of PUSCH/PDSCH resources. Therefore, it may be necessary to repeatedly transmit the PUSCH/PDSCH at intervals shorter than the slot.

URLLC, which is one of the representative scenarios of the next-generation system, has low-latency and high-reliability requirements: a user-plane delay of 0.5 ms and transmission of X bytes of data within 1 ms at or below an error rate of $10^{-5}$. In general, eMBB has a large traffic capacity, but URLLC traffic has a file size of several tens to several hundred bytes and occurs sporadically. Therefore, eMBB requires a transmission method capable of maximizing the transmission rate and minimizing control information overhead, but URLLC requires a short scheduling time unit and a reliable transmission method.

The reference time unit assumed/used to transmit/receive a physical channel may vary according to application fields or traffic types. The reference time may be a basic unit for scheduling a specific physical channel, and the reference time unit may vary according to the number of symbols included in the corresponding scheduling time unit and/or SCS thereof. In some examples/implementations of the present disclosure, a slot or mini-slot is used as the reference unit for convenience of description. The slot may be, for example, a basic scheduling unit used for general data traffic (e.g., eMBB). The mini-slot, which is a basic scheduling unit used for a specific communication method with a specific purpose (e.g., URLLC, unlicensed band, millimeter wave, etc.) may have a smaller time duration than the slot in the time domain. The example(s)/implementation(s) of the present disclosure are applicable both when a physical channel is transmitted/received based on the mini-slot for eMBB services or when a physical channel is transmitted/received based on the slot for URLLC or other communication techniques.

In some RAT scenarios, if the UE is dynamically configured with radio transmission and resource allocation to be used therefor, the UE may not expect that the link direction of the resource allocation indicated by the BS collides with another link direction indicated by a semi-static DL/UL configuration or SFI. For example, in some scenarios, the UE may not expect that a symbol indicated as UL by the semi-static DL/UL configuration or SFI DCI is also indicated as a DL resource by DCI. As another example, in some scenarios, the UE may not expect that a symbol indicated as DL by the semi-static DL/UL configuration or SFI DCI is also indicated as a UL resource by DCI. In these scenarios, the UE may fully trust a dynamically received UL or DL transmission indication and perform the operation according to the UL or DL transmission indication. In some scenarios, when a resource region dynamically allocated by DCI is repeatedly used in a plurality of slots (e.g., when the resource region dynamically allocated by the DCI is applied to each of the plurality of consecutive slots), the UE may not expect that for initial transmission explicitly indicated by the DCI, the link direction of the initial transmission collides with the link direction indicated by the semi-static DL/UL configuration or SFI. If repeated transmission caused by the DCI collides with the semi-static DL/UL configuration or the link direction indicated by the semi-static DL/UL configuration or SFI, the UE may perform an indicated operation except for the corresponding transmission/reception.

In some implementations of the present disclosure, the link direction indicated by the semi-static DL/UL configuration may mean the link direction of DL or UL transmission configured by RRC signaling, system information, and/or UE-dedicated RRC signaling. For example, the link directions of symbols according to a TDD DL-UL pattern configured UE-commonly or UE-dedicatedly by RRC signaling may be link directions indicated by the semi-static DL/UL configuration. As another example, a symbol pattern invalid for DL/UL transmission may be configured UE-commonly or UE-dedicatedly by RRC signaling, and the link directions of symbols valid for DL/UL by the pattern may be link directions indicated by the semi-static DL/UL configuration. When the BS provides to the UE a resource set unavailable for a PDSCH or PUSCH (for example, in rate-matching pattern information, etc.), DL/UL symbols not indicated as invalid DL/UL symbols in the corresponding resource set may be DL/UL symbols semi-statically configured.

The following scenarios may be considered: the BS allocates resources at once over a wide time region including the slot boundary and the UE or BS performs transmission/reception only in consecutive available resource periods may be considered. In such scenarios, it may be difficult for the BS to schedule transmission/reception by avoiding unavailable resources all the time. In other words, it may be difficult for the BS/UE to consider that available resources are always contiguous with each other even except for the slot boundary. In this case, if the BS drops transmission/reception having a different link direction from a resource indicated by the semi-static DL/UL configuration or SFI among multiple transmission/reception indicated by one-shot scheduling, it may cause significant performance degradation in the data transmission/reception. For example, when the UE/BS divides a transmission duration of a total of 14 symbols into a transmission duration of 10 symbols and a transmission duration of 4 symbols and performs transmission of a length of 10 symbols and transmission of a length of 4 symbols in order to avoid slot boundaries, if a collision occurs in only one symbol among the 10 symbols of the first half, the UE/BS may drop the transmission in all 10 symbols and perform the transmission only in the 4 symbols of the second half. For transmission where the transmission reliability is important (e.g., URLLC transmission), the performance degradation may become a serious issue. This problem may occur not only in resource allocation including a slot boundary (hereinafter, multi-segment resource allocation) but also in resource allocation for single transmission in a slot. The above problem may also occur when small resource allocation is repeated in a slot. To avoid the problem, the present disclosure proposes that even if some symbols on allocated resources are unavailable, the remaining symbols are used for transmission except for the unavailable symbols, instead of dropping all resources from the transmission. Hereinafter, implementations of the present disclosure are mainly described based on the multi-segment resource allocation, but the implementations of the present disclosure may also be applied to other resource allocation methods.

To support various resource allocation methods, the BS may explicitly provide multiple resource allocation to the UE, thereby enabling flexible scheduling. For example, if the BS provides a plurality of SLIVs to the UE via one UL grant, the UE may perform multiple transmission or reception over one or several slots based on one message (in such a way that transmitted or received resources include slot boundaries).

As described above, the UE may be instructed or configured with one TDRA entry available for UL transmission or DL reception through the TDRA field from the BS. Here, the TDRA entry may be the same concept as the above-described row index in the allocation table for the PDSCH or PUSCH. One TDRA entry may include multiple pieces of TDRA information rather than one piece of TDRA information. In this case, the multiple pieces of TDRA information may be TDRA information related to a plurality of slots.

In addition, one piece of TDRA information may include at least two or more elements: one start symbol, one last symbol, and one length (i.e., the number of symbols) in the time domain. For example, the TDRA information may be the same as or similar to SLIV information. That is, the TDRA information may be regarded as a more comprehensive concept than the SLIV.

Hereinafter, the present disclosure discloses various examples of signaling methods of minimizing signaling overhead that may occur when multiple pieces of resource allocation information need to be transmitted or received at once for URLLC and maximizing the flexibility of resource allocation between the BS and UE. According to the various examples of the present disclosure, the UE and BS may transmit and receive multiple pieces of resource allocation information while minimizing signaling overhead.

Figure 12:
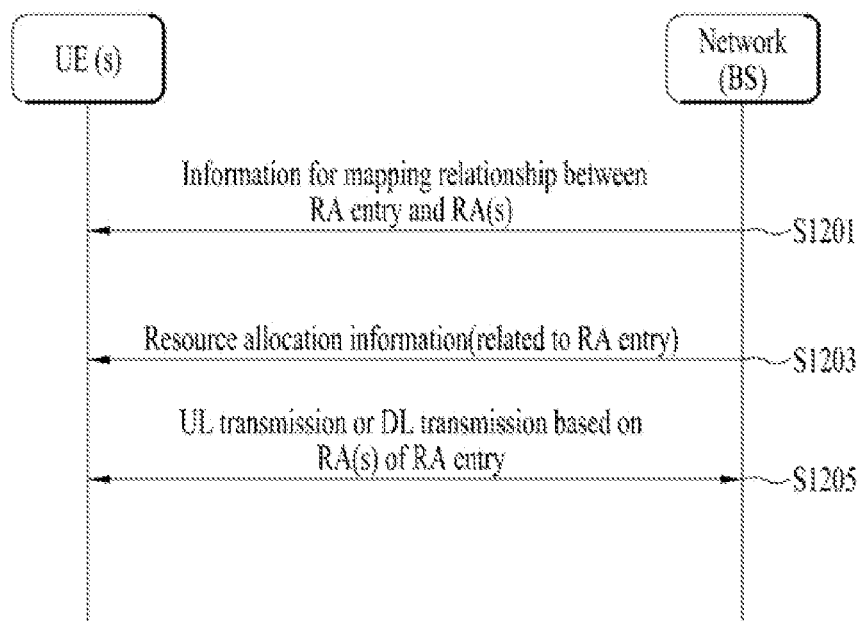
FIG. 12 illustrates an uplink/downlink transmission process for various examples of the present disclosure.

FIG. 12 is a flowchart of a UL/DL transmission/reception method according to an example of the present disclosure.

Referring to FIG. 12, a network (e.g., at least one BS) may transmit information on a mapping relationship between a TDRA entry and TDRA information (or multiple pieces of TDRA information) to a UE in S1201. The information on the mapping relationship may be transmitted to the UE through RRC signaling. Meanwhile, step S1201 may be omitted if the mapping relationship between the TDRA entry and TDRA information (or multiple pieces of TDRA information) is predefined.

In 51203, the network may transmit resource allocation information to the UE. The resource allocation information may be delivered through L1 signaling or higher layer signaling. The resource allocation information may include FDRA and/or TDRA information. Also, the UE may receive a message including the resource allocation information from the network.

The method may further include a step in which the UE interprets the received resource allocation information. For example, when the resource allocation information is TDRA information, the TDRA information may include at least one piece of information related to the following elements: an SLIV, a slot offset, and a DMRS mapping type. In addition, the UE may additionally apply other information (e.g., the number of times that transmission is repeated, repeated transmission factors, etc.) when applying the TDRA information.

In S1205, the UE may perform PDSCH reception or PUSCH transmission based on the resource allocation interpretation, and the BS may perform PDSCH transmission or PUSCH reception on radio resources expected to be interpreted by the UE.

According to the implementation disclosed in FIG. 12, the UE may obtain resource allocation for a plurality of time/frequency resources from the resource allocation information provided by the BS and specify a time/frequency resource to be used for transmission or reception by applying additional information that may be transmitted along with the resource allocation information. In addition, the BS may provide the resource allocation information related to the plurality of time/frequency resources to the UE through L1 signaling or higher layer signaling by assuming that the UE performs the above operation. Accordingly, signaling overhead may be minimized, and resource allocation flexibility between the BS and the UE may be maximized.

On the other hand, one or multiple pieces of TDRA information corresponding to each TDRA entry of the present disclosure may be predefined in communication specifications. Alternatively, as described above, the BS may preconfigure a mapping relationship between a TDRA entry and TDRA information TDRA information (or multiple pieces of TDRA information) to the UE through RRC signaling. Based on the mapping relationship between the TDRA entry and TDRA information (or multiple pieces of TDRA information), which is predefined or RRC-configured, and a TDRA entry indicated to the UE, the UE may obtain TDRA information corresponding to the indicated TDRA entry. The UE may perform UL transmission or DL reception through L1 signaling (e.g., DCI) or higher layer signaling (e.g., RRC signaling) based on the obtained TDRA information.

When multiple pieces of TDRA information are related to one TDRA entry, the UE may transmit a plurality of PUSCHs or receive a plurality of PDSCHs respectively based on the multiple pieces of TDRA information related to the TDRA entry. Alternatively, the UE may transmit one PUSCH multiple times or receive one PDSCH multiple times based on the multiple pieces of TDRA information related to the TDRA entry.

Various examples of the present disclosure will be described based on the TDRA entry in resource allocation information, but the examples of the present disclosure are also applicable to the FDRA entry.

Example 1

According to an example of the present disclosure, when a plurality of slot offsets (e.g., K0 or K2) are explicitly indicated or configured together for a plurality of SLIVs, unnecessary signaling overhead may occur. To reduce such signaling overhead, the plurality of slot offsets may be predefined for the plurality of SLIVs. Alternatively, the BS may preconfigure to the UE the plurality of slot offsets for the plurality of SLIVs. Alternatively, the plurality of slot offsets may be indicated or configured based on the start symbol S of the SLIV.

Specifically, N SLIVs (V_0, V_1, V_(N−1)) may be predefined for a single TDRA entry, or the BS may indicate/configure the N SLIVs to the UE. Here, V_0, V_1, V_(N−1) may be the indices of the N SLIVs, respectively. The N SLIVs may be related to S_0, S_1, S_(N−1) and L_0, L_1, L_(N−1).

In addition, at least one piece of different resource allocation information (i.e., multiple pieces of resource allocation information) including the plurality of SLIVs together with the single TDRA entry may be predefined. Alternatively, the BS may indicate/configure the multiple pieces of resource allocation information to the UE. In this case, the UE may receive one piece of resource allocation information (e.g., the TDRA entry related to the N SLIVs (V_0, V_1, V_(N−1)) from the multiple pieces of resource allocation information from the BS through L1 signaling (e.g., PDCCH) or higher layer signaling In this case, SLIV V_0 corresponding to the lowest index among the N SLIVs related to the single TDRA entry indicated or configured to the UE by the BS may represent at least one of the start symbol, the last symbol, and the number of symbols of an allocated resource. That is, S_0 of SLIV V_0 may indicate the start position start symbol) of the allocated resource related to SLIV V_0 in a slot.

Each of the SLIVs with the remaining indices except for SLIV V_0, for example, SLIV V_n (where n≠0) may represent at least one of the start symbol, the last symbol, and the number of symbols of an allocated resource related to each SLIV, based on the last symbol or the last time point of an allocated resource related to SLIV V_(n−1) with the previous index. Specifically, S_1 of SLIV V_1 may be an offset between the last symbol of an allocated resource allocated based on SLIV_0 (i.e., a resource allocated by the number of symbols L_0 from the start symbol of a slot S_0) and the start symbol of an allocated resource allocated based on SLIV V_1.

Further, S_n of SLIV V_n may be an offset between the last symbol of an allocated resource allocated based on SLIV V_(n−1) and the start symbol of an allocated resource allocated based on SLIV V_n.

Figure 13:
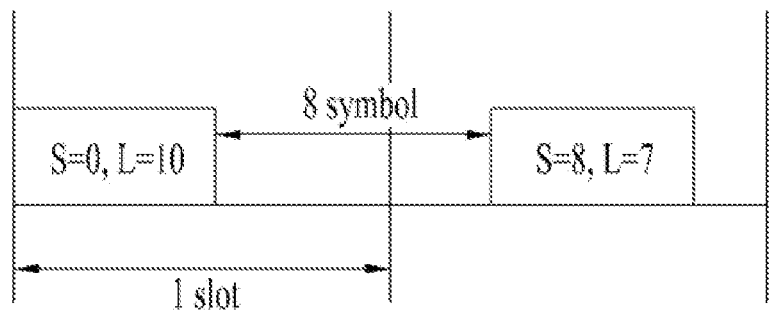
FIG. 13 is a diagram for explaining resource allocation based on a plurality of start and length indicator values (SLIVs) according to an example of the present disclosure.

FIG. 13 is a diagram for explaining resource allocation based on a plurality of SLIVs according to an example of the present disclosure.

Referring to FIG. 13, when two SLIVs are included in a single TDRA entry, the first SLIV (SLIV with a low index) may be interpreted to have S1=0 and L1=10, and the second SLIV (SLIV with a high index) may be interpreted to have S2=8 and L2=7.

If the UE is instructed by the BS to use the TDRA entry for UL transmission or DL reception, the UE may interpret an allocated resource based on the first SLIV as a radio resource including 10 symbols from the start symbol of one slot. In addition, the UE may interpret an allocated resource based on the second SLIV as a radio resource including 7 symbols from the symbol behind 8 symbols from the last symbol of the allocated resource based on the first SLIV. That is, S0 related to the first SLIV indicates the index of the start symbol in the slot, but S1 related to the second SLIV may indicate an offset between the start symbols of the allocated resource based on the first SLIV and the start symbol of the allocated resource based on the second SLIV, instead of indicating the index of the start symbol in the slot.

As another implementation of Example 1, among the N SLIVs (V_0, V_1, V_(N−1)) related to the single TDRA entry, the remaining N−1 SLIVs except for the first SLIV (SLIV V_0) may include length information (i.e., the number of symbols L). In this case, the value of S related to the remaining SLIVs except for the first SLIV may be 0. Alternatively, the start symbol of an allocated resource based on each of the remaining SLIVs (e.g., SLIV V_n) may be equal to the last symbol or the last time point of an allocated resource based on an SLIV with the previous index (e.g., SLIV V_(n−1)).

In addition, when a plurality of SLIVs are related to one TDRA entry, a bitmap indicating whether each SLIV is applied may be used. Alternatively, when the UE is indicated/configured with each SLIV, the UE may be indicated/configured with information indicating whether each SLIV is applied.

Assuming that among the N SLIVs (V_0, V_1, V_(N−1)) related to the single TDRA entry, the start symbol and the number of symbols of one SLIV, SLIV V_n are S_n and L_n, respectively, if there is m satisfying Equation 1 below, the BS may configure an SLIV to the UE so that there is k satisfying Equation 2 below. In addition, the UE may also expect this.

$$s_0 + \Sigma_{n=0}^{N-1} L_n > 14*m (m=1,2,3,\ldots) \qquad \text{[Equation 1]}$$

$$s_0 + \Sigma_{n=0}^{k} L_n = 14*m \qquad \text{[Equation 2]}$$

When the BS configures an SLIV so that there is k satisfying Equation 2, an allocated resource based on the SLIV configured by the BS may be always aligned with the slot boundary without including the slot boundary, thereby simplifying the operation implementation of the UE. For example, if SLIV V_0 and SLIV V_1 are included in one TDRA entry and S_0++L_1=14*m is satisfied, the last symbol of an allocated resource based on SLIV V_1 is aligned with the slot boundary. That is, the symbol may be set to the last symbol of a slot including the allocated resource based on SLIV V_1.

Alternatively, if k that satisfies Equation 2 does not exist, the UE may expect that the allocated resource based on the SLIV indicated/configured by the BS may not include the slot boundary.

Alternatively, if k that satisfies Equation 2 does not exist and if an SLIV related to an allocated resource including the slot boundary is instructed or configured to be applied, the UE may interpret that the allocated resource based on the indicated SLIV is divided into two allocated resources with respect to the slot boundary. Accordingly, the UE may perform transmission or reception regardless of the slot boundary.

According to Example 1 described above, even if a plurality of SLIVs are related to one TDRA entry, the slot offset (K0 or K2) for an SLIV with the lowest index may be indicated (that is, resource allocation information may include only the slot offset for the SLIV with the lowest index), thereby reducing signaling overhead.

Example 2

According to an example of the present disclosure, when the UE is instructed or configured with one TDRA entry that available for UL transmission or DL reception from the BS, the corresponding TDRA entry may include one piece of TDRA information and one repetition transmission factor. In this case, the repetition transmission factor may mean the number of times that transmission is repeated. One TDRA entry may have one of the following structures according to the configuration of the BS.

Including one SLIV
Including one SLIV and one repetition transmission factor
Including multiple SLIVs One allocation table may indicate TDRA entries with different structures. Alternatively, a plurality of allocation tables may exist, and one TDRA entry structure may be used for each allocation table.

On the other hand, if one TDRA entry has a structure including one SLIV and one repetition transmission factor, the UE may repeatedly use a given SLIV as many times as indicated by the repetition transmission factor. In this case, transmission may be repeated by using the same SLIV for each slot. In other words, an allocated resource having the same start symbol and the same number of symbols for each slot may be transmitted or received as many times as the number of repetitions indicated by the repetition transmission factor.

Alternatively, transmission may be continuously repeated with no intervals between repetitions in a sufficient number of consecutive (available) symbols. In other words, allocated resources related to the repetition transmission factor may be continuously positioned with each other in the time domain, instead of repeating transmission in each slot.

Figure 14:
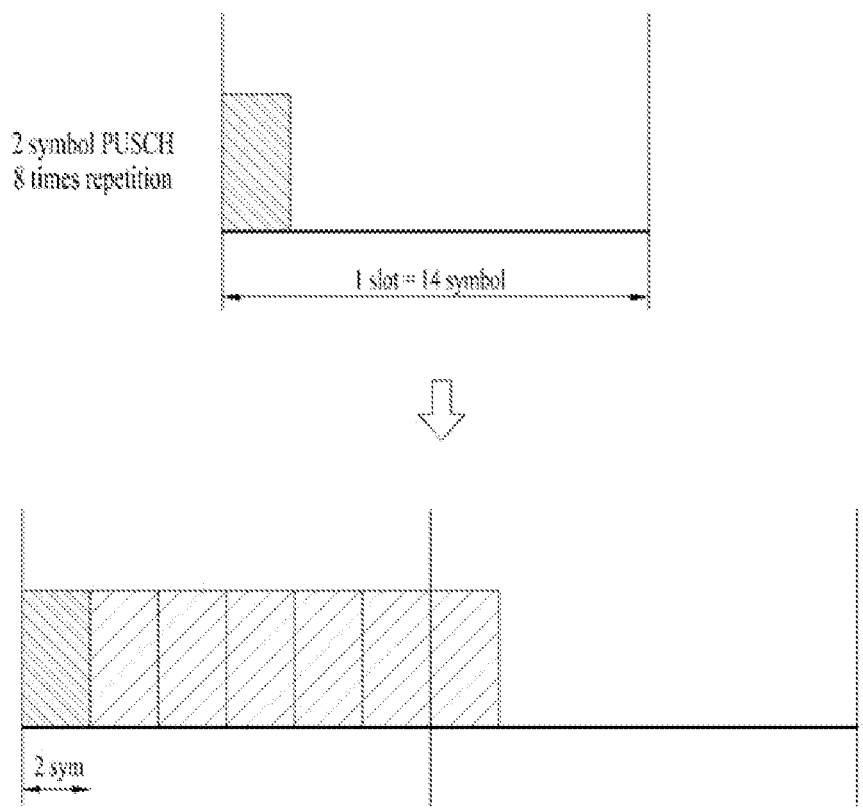
FIG. 14 is a diagram for explaining application of a repetition transmission factor according to an example of the present disclosure.

FIG. 14 is a diagram for explaining application of a repetition transmission factor according to an example of the present disclosure.

Referring to FIG. 14, for example, when the number of repetitions indicated by the repetition transmission factor is 8, one allocated resource may be continuously repeated 8 times without an interval between allocated resources, instead of repeating the allocated resource 8 times in each slot.

Example 3

According to an example of the present disclosure, when the UE is instructed or configured with one TDRA entry available for UL transmission or DL reception from the BS, the TDRA entry may include two pieces of TDRA information and one repetition transmission factor. In this case, the repetition transmission factor may indicate the number of aggregated slots that may be used in association with the two pieces of TDRA information.

For example, when the UE receives two SLIVs (SLIV V_0, SLIV V_1), a repetition transmission factor K, and a slot offset through a single TDRA entry, the UE may obtain radio resources in a specific slot N indicated by the given slot offset based on SLIV V_0. In addition, the UE may assume that the UE is allowed to continuously use the radio resources in K slots from slot N+1 to slot N+K based on the repetition transmission factor K. That is, when the single TDRA entry including the repetitive transmission factor K indicating the number of aggregated slots is indicated, all consecutive symbols included in the range of slot N+1 to slot N+K may be used as an allocated resource. In addition, the UE may acquire radio resources in slot N+K+1 based on SLIV V_1. Accordingly, it is possible to indicate radio resources including consecutive symbols in several slots while maintaining SLIV-related configurations.

On the other hand, when radio resources allocated to the UE in one slot include an unavailable resource such as a DL/UL switching point or an opposite direction resource (e.g., DL symbol for UL resource, UL symbol for DL resource, etc.), the UE may perform transmission or reception on available consecutive symbols except for the unavailable resource. In other words, the UE may assume that resources are segmented with respect to the unavailable resource.

In addition, the UE may assume that the unavailable resource may exist only in the K slots from slot N+1 to slot N+K. In other words, the UE may assume that there is no unavailable resource in slots N and N+K+1 to which SLIV V_0 and SLIV V_1 are applied or that the unavailable resource does not collide with the allocated resources related to SLIV V_0 and SLIV V_1.

Example 4

According to an example of the present disclosure, when the UE is instructed or configured with one TDRA entry available for UL transmission or DL reception from the BS, the UE may be instructed or configured with multiple pieces of TDRA information based on the TDRA entry. If the UE is also instructed or configured with a repetition transmission factor K, the UE may use K pieces of TDRA information among the multiple pieces of TDRA information based on the given repetition transmission factor.

For example, when N SLIVs (V_0, V_1, V_(N−1)) are predefined for one TDRA entry or the N SLIVs are indicated or configured by the BS, the UE may be instructed or configured to use the TDRA entry for UL transmission or DL reception. In this case, if the UE is also instructed or configured with the repetition transmission factor K, the UE may use only K SLIVs (V_0, V_1, . . . , V_(K−1)) in the corresponding TDRA entry. If other information such as a slot offset and a DMRS mapping type related to each SLIV is indicated or configured together, K pieces of information may also be used.

According to Example 4, resources for the maximum number of repetitions are allocated by one TDRA entry, but the length of actual transmission is adjusted by a separate repetition transmission factor, thereby achieving more flexible resource allocation. In other words, the BS may allocate a plurality of resources by indicating a plurality of SLIVs through one TDRA entry and adjust the amount of resources (the size of a resource region in the time domain) to be used for transmission or reception among the plurality of allocated resources with a repetition transmission factor.

In addition, even if the UE receives a small allocation table (e.g., an allocation table with a small number of indices) from the BS while perform initial access to the network, flexible resource allocation may be enabled by the repetition transmission factor, which is indicated after the initial access.

Example 5

When the UE is instructed or configured with one TDRA entry available for UL transmission or DL reception from the BS, when the one TDRA entry includes N pieces of TDRA information, and when the UE is instructed or configured with the information for periodic resources (e.g., configured grant or DL SPS), the UE may use the TDRA information defined within a given periodicity in consideration of the periodicity.

For example, when one TDRA entry indicates N pieces of TDRA information applicable to a plurality of consecutive slots and when the one TDRA entry is used for resource allocation that is repeated with a periodicity of P symbols (or X slots), the UE may use only K pieces of TDRA information defined within the P symbols among the N pieces of TDRA information related to with the given TDRA entry. In this case, K N may be satisfied. Here, the K pieces of TDRA information defined within the P symbol may refer to TDRA information indicating an allocated resource included in the P symbol. According to Example 5, one TDRA entry may support various periodicities, and there may be no problem in determining a HARQ process ID.

As another implementation of Example 5, when the periodicity is less than or equal to a specific value, for example, when the periodicity is less than one slot or 14 symbols (12 symbols in the extended CP), the UE may use only a predetermined number (e.g., one) of pieces of TDRA information among multiple pieces of TDRA information included in a given TDRA entry. In this case, the specific value and the predetermined number may be indicated or configured through L1 signaling or higher layer signaling between the UE and BS.

Example 6

When the UE is explicitly instructed or configured with a plurality of slot offsets (e.g., K0 or K2) for a plurality of SLIVs, it may cause unnecessary signaling overhead. Accordingly, according to an example of the present disclosure, the plurality of slot offsets may be predefined for the plurality of SLIVs, or the BS may indicate or configure the plurality of slot offsets to the UE in advance. This may mean that the plurality of slot offsets are indirectly defined, indicated, or configured for the plurality of SLIVs by predefining the number of SLIVs applied to one slot or configuring or indicating the number of SLIVs applied to one slot to the UE.

For example, when N SLIVs (V_0, V_1, V_(N−1)) are predefined or when the BS indicates or configures the N SLIVs to the UE, the number K of SLIVs applied to one slot may be predetermined, or it may be configured or indicated to the UE. This may mean that the UE sequentially uses K SLIVs among the indicated or configured N SLIVs for each slot.

For example, when the number of SLIVs applied to one slot is determined to be K, the indices of SLIVs used in an n-th slot may be V_(K*n), V_(K*n+1), ..., V_(K*n+K−1).

The number of SLIVs applied to one slot may be predetermined, configured, or indicated to be the same for all slots, or the number of SLIVs applied to each slot may be indicated to the UE from the BS through L1 signaling or higher layer signaling. Accordingly, the slot offsets for the plurality of SLIVs may be indicated to the UE while maintaining SLIV configurations without separately indicating the slot offsets.

Example 7

According to an example of the present disclosure, when the UE is instructed or configured with one TDRA entry available for UL transmission or DL reception from the BS, the TDRA entry may include one multi-start and length indicator value (mSLIV) capable of indicating a plurality of TDRAs for a plurality of slots. That is, the mSLIV may be an SLIV capable of indicating a plurality of resource allocation units rather than an SLIV indicating one resource allocation unit.

Specifically, one TDRA entry may include N mSLIVs. In this case, each mSLIV may be applied to each of the N slots. That is, each mSLIV may be interpreted as a plurality of TDRAs for one slot. For example, the mSLIV may indicate two radio resources that may be included in one slot.

Figure 15:
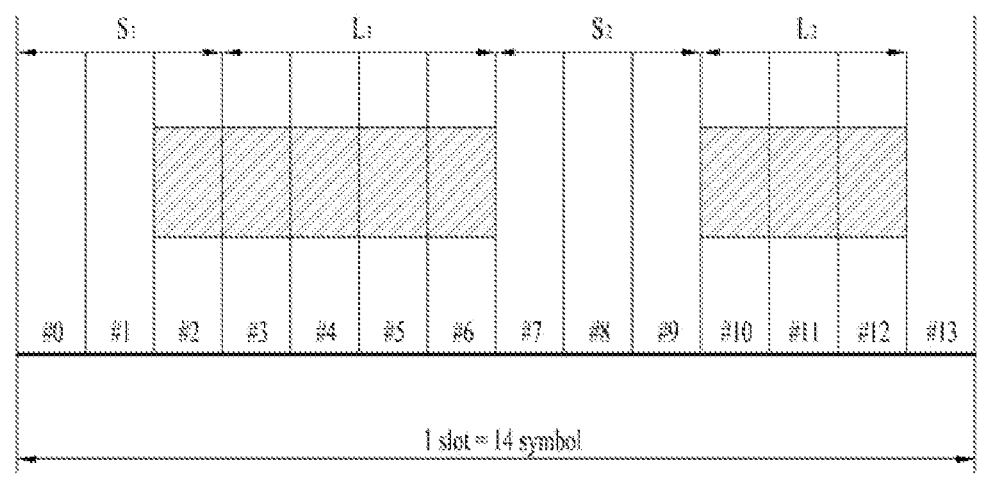
FIG. 15 is a diagram for explaining resource allocation by a multi-start and length indicator value (mSLIV) according to an example of the present disclosure.

FIG. 15 is a diagram for explaining resource allocation by an mSLIV according to an example of the present disclosure.

Referring to FIG. 15, one mSLIV applied to each slot may allocate two radio resources. To this end, one mSLIV may indicate two start symbols S1 and S2 and two symbol numbers L1 and L2. In FIG. 15, S1=2 and S2=10, and L1=5 and L2=3.

When two SLIVs are used to indicate two radio resources, each SLIV may have a size of 7 bits, and thus signaling overhead of 14 bits may occur. However, according to the implementation disclosed in Example 7 (one mSLIV capable of allocating two radio resources), possible information states, that is, the structures (or locations) of two allocatable radio resources may be regarded as the same as the number of ways of selecting four reference points among 15 symbol boundaries. Since it may be regarded as indicating a total of 1360 information states, signaling overhead of up to 11 bits may be caused. Also, if a formula or table for determining the mSLIV (i.e., formula or table related to the mSLIV) is defined, the signaling overhead may be reduced while maintaining the same scheduling flexibility.

In addition, in consideration of a case in which one radio resource is allocated to one slot and a case in which two radio resources are allocated to one slot, which one of the SLIV and mSLIV is used may be indicated or configured by an additional one bit, a one-bit flag, or an extra data field/parameter.

Further, the mSLIV may be used in a slot in which two UL/DL switching points exist.

Figure 16:
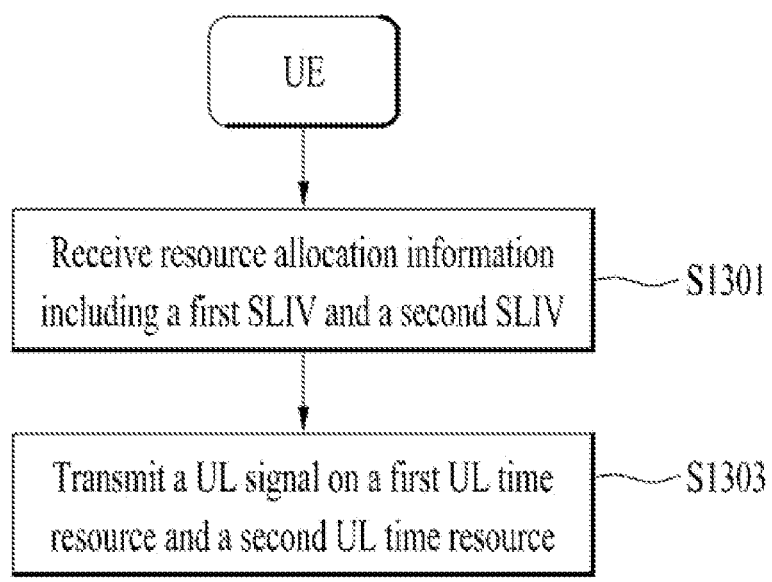
FIG. 16 is a flowchart of an uplink signal transmission method for a user equipment (UE) according to an example of the present disclosure.

FIG. 16 is a flowchart of a UL signal transmission method for a UE according to an example of the present disclosure.

Referring to FIG. 16, a UE may receive resource allocation information including a first SLIV and a second SLIV from a BS in S1301. The resource allocation information may be received through RRC signaling. In addition, the UE may receive one or more pieces of different resource allocation information including a plurality of SLIVs together with the resource allocation information.

In this case, the first SLIV may be related to a start symbol S1 of a first UL time resource and the number of symbols L1 of the first UL time resource, and the second SLIV may be related to an offset S2 related to a start symbol of a second UL time resource and the number of symbols L2 of the second UL time resource, where S1 and S2 may be integers greater than or equal to 0, and L1 and L2 may be integers greater than or equal to 1. In addition, S2 may be an offset between a last symbol of the first UL time resource and the start symbol of the second UL time resource.

The resource allocation information further includes a third SLIV. The third SLIV may be related to an offset S3 related to a start symbol of a third UL time resource and the number of symbols L3. S3 may be an offset between a last symbol of the second UL time resource and the start symbol of the third UL time resource.

The resource allocation information may further include a slot offset related to the first SLIV without a slot offset related to the second SLIV. That is, since the offset related to the second SLIV may be indicated by S2, the slot offset related to the second SLIV may be omitted.

In S1303, the UE may transmit a UL signal to the BS on the first UL time resource and the second UL time resource based on the resource allocation information.

The UL signal transmission method for the UE may further include receiving a DL signal including the resource allocation information and information indicating one piece among the one or more pieces of different resource allocation information. The information indicating the resource allocation information and the one piece of information among the one or more pieces of different resource allocation information may be received through L1 signaling (e.g., DCI).

Figure 17:
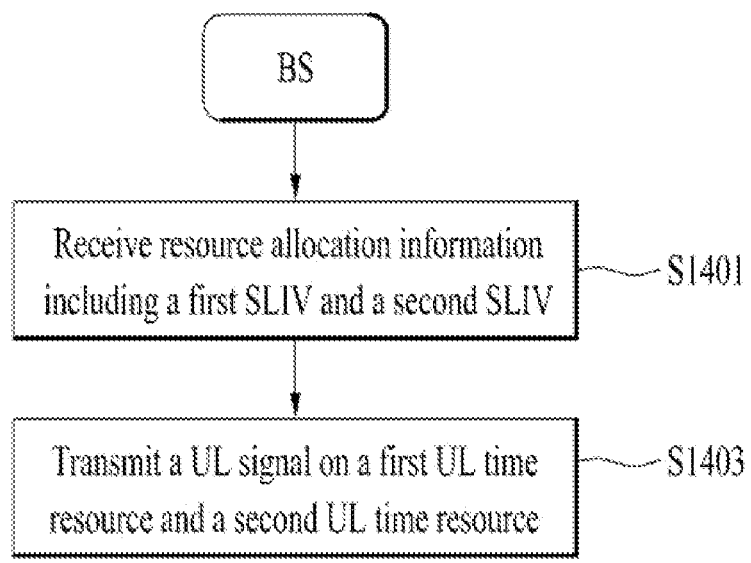
FIG. 17 is a flowchart of an uplink signal reception method for a base station according to an example of the present disclosure.

FIG. 17 is a flowchart of a UL signal reception method for a BS according to an example of the present disclosure. Hereinafter, the configurations described above in FIG. 16 will be omitted.

Referring to FIG. 17, a BS may transmit resource allocation information including a first SLIV and a second SLIV to a UE in S1401. In this case, the first SLIV may be related to a start symbol S1 of a first UL time resource and the number of symbols L1 of the first UL time resource, and the second SLIV may be related to an offset S2 related to a start symbol of a second UL time resource and the number of symbols L2 of the second UL time resource, where S1 and S2 may be integers greater than or equal to 0, and L1 and L2 may be integers greater than or equal to 1. In addition, S2 may be an offset between a last symbol of the first UL time resource and the start symbol of the second UL time resource.

In S1403, the BS may receive a UL signal from the UE on the first UL time resource and the second UL time resource based on the resource allocation information.

The examples of the present disclosure are provided so that those skilled in the art related to the present disclosure may implement and practice the present disclosure. Although the description has been made with reference to the examples of the present disclosure, those skilled in the art may variously modify and change the examples of the present disclosure. Accordingly, the present disclosure is not intended to be limited to the examples set forth herein but is to be accorded the widest scope consistent with the principles and novel features disclosed herein.

INDUSTRIAL APPLICABILITY

The implementations of the present disclosure may be employed for a base station, a user equipment, and other apparatuses in a wireless communication system.

The invention claimed is:

1. A method of transmitting an uplink signal by a user equipment (UE) in a wireless communication system, the method comprising:
receiving resource allocation information including a single length related value and a single repetition factor, wherein the single length related value is related to a number of symbols of an uplink time resource; and
transmitting the uplink signal on uplink time resources based on the resource allocation information,
wherein the single repetition factor informs the UE of a number of repetitions related to the single length related value for allocation of the uplink time resources.

2. The method of claim 1, further comprising:
receiving one or more pieces of different resource allocation information including a plurality of length related values together with the resource allocation information; and
receiving a downlink signal including the resource allocation information and information on one piece among the one or more pieces of different resource allocation information.

3. The method of claim 1, wherein the resource allocation information is received through radio resource control (RRC) signaling.

4. An apparatus for a user equipment (UE) in a wireless communication system, the apparatus comprising:
at least one processor; and
at least one memory operably connected to the at least one processor and configured to store one or more instructions that cause the at least one processor to perform operations comprising:
receiving resource allocation information including a single length related value and a single repetition factor, wherein the single length related value is related to a number of symbols of an uplink time resource; and
transmitting the uplink signal on uplink time resources based on the resource allocation information,
wherein the single repetition factor informs the processor of a number of repetitions related to the single length related value for allocation of the uplink time resources.

5. A user equipment (UE) configured to transmit an uplink signal in a wireless communication system, the UE comprising:
at least one transceiver;
at least one processor; and
at least one memory operably connected to the at least one processor and configured to store one or more instructions that cause the at least one processor to perform operations comprising:
receiving resource allocation information including a single length related value and a single repetition factor, wherein the single length related value is related to a number of symbols of an uplink time resource; and
transmitting the uplink signal on uplink time resources based on the resource allocation information,
wherein the single repetition factor informs the processor of a number of repetitions related to the single length related value for allocation of the uplink time resources.

6. A computer readable storage medium configured to store at least one computer program including one or more instructions that, when executed by at least one processor, cause the at least one processor to perform operations for a user equipment (UE), the operations comprising:
receiving resource allocation information including a single length related value and a single repetition factor, wherein the single length related value is related to a number of symbols of an uplink time resource; and
transmitting the uplink signal on uplink time resources based on the resource allocation information,
wherein the single repetition factor informs the processor of a number of repetitions related to the single length related value for allocation of the uplink time resources.

7. A method of receiving an uplink signal by a base station in a wireless communication system, the method comprising:
transmitting resource allocation information including a single length related value and a single repetition factor, wherein the single length related value is related to a number of symbols of an uplink time resource; and
receiving the uplink signal on uplink time resources based on the resource allocation information,
wherein the single repetition factor relates to a number of repetitions related to the single length related value for allocation of the uplink time resources.

8. A base station configured to receive an uplink signal in a wireless communication system, the base station comprising:
at least one processor; and
at least one memory operably connected to the at least one processor and configured to store one or more instructions that cause the at least one processor to perform operations comprising:
transmitting resource allocation information including a single length related value and a single repetition factor, wherein the single length related value is related to a number of symbols of an uplink time resource; and
receiving the uplink signal on uplink time resources based on the resource allocation information,
wherein the single repetition factor relates to a number of repetitions related to the single length related value for allocation of the uplink time resources.

* * * * *